(12) United States Patent
Dufresne

(10) Patent No.: US 12,379,062 B2
(45) Date of Patent: Aug. 5, 2025

(54) ASSEMBLIES FOR ALIGNMENT AND LEVELING OF AN ELECTROLYTIC TANK UPON EXPANSION OR RETRACTION THEREOF

(71) Applicant: PULTRUSION TECHNIQUE INC., Saint-Bruno-de-Montarville (CA)

(72) Inventor: Robert Dufresne, Saint-Bruno-de-Montarville (CA)

(73) Assignee: PULTRUSION TECHNIQUE INC., Saint-Bruno-de-Montarville (CA)

( * ) Notice: Subject to any disclaimer, the term of this patent is extended or adjusted under 35 U.S.C. 154(b) by 0 days.

(21) Appl. No.: 18/734,783

(22) Filed: Jun. 5, 2024

(65) Prior Publication Data

US 2024/0344650 A1    Oct. 17, 2024

Related U.S. Application Data

(62) Division of application No. 17/429,573, filed as application No. PCT/CA2020/050178 on Feb. 11, 2020, now Pat. No. 12,038,130.

(Continued)

(51) Int. Cl.
   *F16M 7/00* (2006.01)
   *C25C 7/06* (2006.01)

(52) U.S. Cl.
   CPC .............. *F16M 7/00* (2013.01); *C25C 7/06* (2013.01)

(58) Field of Classification Search
   CPC .............. F16M 7/00; C25C 7/06; C25C 7/00
   (Continued)

(56) References Cited

U.S. PATENT DOCUMENTS 2,974,917 A * 3/1961 Kappen ................. B65D 19/42
                                                  108/56.1
3,001,797 A * 9/1961 Kappen .................... B62B 1/08
                                                     280/46

(Continued)

FOREIGN PATENT DOCUMENTS

CA    2405965    3/2003
CA    2485745    5/2005

(Continued)

OTHER PUBLICATIONS

International Search Report and Written Opinion for international application No. PCT/CA2020/050178, mailed on May 14, 2020.

(Continued)

*Primary Examiner* — Muhammad Ijaz
(74) *Attorney, Agent, or Firm* — Womble Bond Dickinson (US) LLP

(57) ABSTRACT

There is provided an electrolytic tank assembly facilitating alignment and levelling of an electrolytic tank with respect to adjacent electrolytic tank. A levelling assembly can include a plurality of adjustable levelling mechanisms being independently actuable to cause upward or downward movement of the electrolytic tank. A sole assembly can include friction and sliding soles for controlling transversal movement of an electrolytic tank with respect to support beams onto which the tank is supported. A strap assembly comprising a vertically extending strap and a connector provided at an end of the vertically extending strap can be connected to each adjustable levelling mechanism of the levelling assembly. Various type of connectors can be provided at the other end of the strap to provide anchorage to accessory for operation, lifting, maintenance, etc.

19 Claims, 31 Drawing Sheets

Related U.S. Application Data

(60) Provisional application No. 62/803,806, filed on Feb. 11, 2019.

(58) Field of Classification Search
USPC .............................. 248/180.1, 188.2, 346.07
See application file for complete search history.

(56) References Cited

U.S. PATENT DOCUMENTS

| | | | |
|---|---|---|---|
| 3,923,614 A | 12/1975 | De Nora et al. | |
| 5,881,979 A * | 3/1999 | Rozier, Jr. | A47B 91/024 |
| | | | 248/188.4 |
| 6,231,730 B1 * | 5/2001 | Davis | C25C 7/02 |
| | | | 204/288.5 |
| 2002/0109054 A1 * | 8/2002 | Burr | A47B 91/066 |
| | | | 248/188.4 |
| 2005/0098693 A1 * | 5/2005 | Holt | F16M 7/00 |
| | | | 248/188.4 |
| 2006/0124810 A1 * | 6/2006 | Cotto | A47B 91/024 |
| | | | 248/188.4 |
| 2006/0188362 A1 * | 8/2006 | Link | B65G 65/24 |
| | | | 414/403 |
| 2014/0196969 A1 * | 7/2014 | Jaffarullah | B08B 5/04 |
| | | | 180/200 |
| 2015/0176674 A1 * | 6/2015 | Khan | F16F 9/3207 |
| | | | 403/120 |
| 2015/0225975 A1 * | 8/2015 | Sugita | F16F 15/02 |
| | | | 52/167.1 |
| 2015/0267857 A1 * | 9/2015 | Smith | F16M 7/00 |
| | | | 248/544 |
| 2021/0214879 A1 * | 7/2021 | Lee | D06F 39/125 |

FOREIGN PATENT DOCUMENTS

| | | |
|---|---|---|
| CN | 102121115 A | 7/2011 |
| CN | 203870063 U | 10/2014 |

OTHER PUBLICATIONS

International Preliminary Report on Patentability for international application No. PCT/CA2020/050178, issued on Aug. 10, 2021, with corrected version of Written Opinion mailed on Jun. 29, 2020.

* cited by examiner

ASSEMBLIES FOR ALIGNMENT AND LEVELING OF AN ELECTROLYTIC TANK UPON EXPANSION OR RETRACTION THEREOF

RELATED APPLICATION

This application is a divisional of U.S. application Ser. No. 17/429,573, filed Aug. 9, 2021, titled "ASSEMBLIES FOR ALIGNMENT AND LEVELING OF AN ELECTROLYTIC TANK UPON EXPANSION OR RETRACTION THEREOF," which is a U.S. National Phase Under 35 U.S.C. § 371 of International Application No. PCT/CA2020/050178, titled "ASSEMBLIES FOR ALIGNMENT AND LEVELING OF AN ELECTROLYTIC TANK UPON EXPANSION OR RETRACTION THEREOF," filed Feb. 11, 2020, which is a PCT application claiming priority under applicable laws to U.S. provisional application No. 62/803,806 filed on Feb. 11, 2019, the contents of all of which are incorporated herein by reference in their entireties for all purposes.

TECHNICAL FIELD

The technical field generally relates to hydrometallurgical refining of metals and equipment used therein, and more particularly to assemblies for aligning and levelling an electrolytic tank with respect to anodes and cathodes placed inside the tank and with respect to adjacent electrolytic tanks provided in a row.

BACKGROUND

Electrolytic tanks for hydrometallurgical refining of metals are conventionally provided adjacent to one another, often in side-to-side relation, as seen in FIGS. 1 to 3 (Prior art). Electrolytic tanks are positioned in alignment with respect to one another and their base is supported by at least four vertical support beams which are organized in two opposed rows.

Positioning and levelling of the electrolytic tanks are performed to enable alignment of an electrolytic tank with respect to another adjacent electrolytic tank, and to enable a level of the electrolytic bath to be parallel to an upper edge of the electrolytic tank. Levelling is crucial to get an adequate efficiency in electrowinning and electrolysis. Positioning and levelling the electrolytic tanks for a first installation or after maintenance thereof can be very laborious due to the size, weight and configuration of the electrolytic tanks.

Indeed, the support beams can be made of concrete which cures unevenly, thereby providing an upper support surface at a variable height. Additionally, each electrolytic tank may be deformed depending on several factors. For example, after manufacture, tank may remain malleable for several days and may be further deformed depending on the temperature and conditions at which they are transported and stored. A tank may be deformed when exposed to high temperatures in ship's holds or when stored by mere placement on an uneven ground. Deformation can occur by torsion, sagging and/or arching.

Known methods for levelling tanks and ensure alignment inside of a same tank, and with respect to one another, include the use of shims of various thicknesses to accommodate differences in the height of the support beams and the deformations of the tanks. Each tank is lifted up and positioned for evaluating its wobbliness. Depending on said wobbliness, the cell may have to be re-lifted up and shims are selected for manual placement between the tank and the support beams. The operation is repeated until equal pressure is imposed on each supported portions of the tank. Then, height and levelling of tank is to be compared and adjusted to match the ones of the adjacent tank.

Additionally, during refining operations, the electrolytic bath contained in the cavity is heated at temperatures between 20 and 76° C., thereby conducting the heat to the electrolytic tank itself. During maintenance operations and metal production periods, the electrolytic bath is drained from the electrolytic tank which causes cooling of the electrolytic tank between −25 and 20° C. Stark variations of temperature lead to thermal expansion and contraction of the walls of the electrolytic tanks.

Expansion and contraction of the walls of the electrolytic tank are not uniformly distributed within a same tank and within a same row of adjacent electrolytic tank, thereby leading to undesired movements of the tanks with respect to one another. It is often seen that, when the tank is heated, one end portion of a tank expands in one direction whereas, when the tank cools down, the other end portion of the same tank retracts, leading to a forward movement of this tank. The adjacent tank may be moved backward for example due to the same opposed deformation principles. Upward and downward movements of the tank may also be encountered. Refining operations have to be stopped to realign the electrolytic tanks with respect to one another to form a straight row, which can be very tedious and costly.

These expansion and contraction movements can move the shims and make them fall off the support beams. The missing shims have to be replaced by lifting the tank up again using a crane, which stops the refining operations.

In another situation wherein shims are not used, expansion and contraction movements may lead to rupture of the tank as the tank is operated in a highly corrosive environment which increases its resistance to friction. Again, refining operations have to be stopped for repairing the damaged tanks and avoid leaks.

There is a number of challenges related to handling and levelling electrolytic tanks that are located or positioned in close proximity to each other.

SUMMARY

The techniques described herein relate to various assemblies for levelling and controlling transversal displacement of an electrolytic tank. Reinforcement assemblies are further provided to ensure integrity of the tank walls during levelling, operation, displacement, lifting and maintenance.

In one aspect, there is provided an adjustable levelling mechanism for levelling an electrolytic tank with respect to a support beam. The adjustable levelling mechanism includes:
  a foot member operatively connected to a lower surface of a base wall of the electrolytic tank, the foot member having at least a portion extending downwardly from the base wall for supporting the electrolytic tank at a given height above the support beam; and
  a levelling member which is actuable to vary a position of the foot member with respect to the electrolytic tank, thereby changing the height at which the electrolytic tank is supported above the support beam.

In some implementations, rotation of the levelling member can actuate the rotation of the foot member with respect to the base wall to vary the height at which the electrolytic tank is supported.

In some implementations, the foot member and the levelling member can be a one-piece structure. For example, the foot member can be a bolt having a threaded portion which is at least partially insertable into the base wall for connection of the adjustable levelling mechanism to the electrolytic tank, and the levelling member can be a nut that is rotatable to further actuate the rotation of the bolt, thereby varying a length of the threaded portion which is inserted within the base wall.

In some implementations and to distribute the stress imposed by the foot member, the mechanism can include a capping member operatively connected to an end portion of the foot member, the capping member being shaped to distribute a weight of the electrolytic tank unto the support beam via the foot member. Optionally, the end portion of the foot member can be of spherical shape and the capping member has an upper surface being recessed to encase the spherical end portion of the foot member to allow pivoting thereof with respect to the capping member. Further optionally, a lower surface of the capping member can be made of a material enabling transversal movements of the electrolytic tank with respect to the support beam via sliding.

In another aspect, there is provided a levelling assembly for levelling an electrolytic tank with respect to a support beam. The levelling assembly includes at least four adjustable levelling mechanisms as defined herein which are provided as two spaced-apart pairs respectively connected at opposed edge portions of the base wall of the electrolytic tank.

In some implementations, the levelling assembly can include a plurality of the adjustable levelling mechanisms being distributed as four clusters and arranged as two spaced-apart pairs of clusters respectively connected at the opposed edge portions of the base wall of the electrolytic tank. For example, each cluster can include three adjustable levelling mechanisms. Optionally, one capping member can be connected to the end portion of all the adjustable levelling mechanisms of a same cluster.

In another aspect, there is provided a sole assembly for controlling transversal movement of an electrolytic tank with respect to support beams onto which the tank is supported. The sole assembly includes:
- a first set of soles configured to provide friction and at least reduce transversal movement of a first portion of the base wall with respect to the corresponding support beams, each sole of the first set being provided between one support beam and the first portion of the base wall of the tank; and
- a second set of soles configured to provide sliding and enable transversal movement of a second portion of the base wall with respect to the corresponding support beams, each sole of the second set being provided between one support beam and the second portion of the base wall of the tank.

In some implementations, the soles of the first set can include a high kinetic friction coefficient material being a rubber-based material. For example, the soles of the second set can include a low kinetic friction coefficient material being Teflon®, Celcon®, Selkon®, HMWHDPE, HDPE, polyethylene, polypropylene, nylon, or any combinations thereof.

In some implementations, each sole of the first and second sets is sized and shaped such that a portion thereof contacts at least a portion of an upper surface of the support beam, and that another portion thereof extends away from the upper surface of the support beam.

In some implementations, the size and shape of each sole from the first set of soles can differ from the size and shape of each sole from the second set of soles.

In some implementations, each of the first set and second set of soles can include pairs of a main sole and a secondary sole, each pair being provided between one support beam and respective first and second portions of the base wall of the tank, thereby forming a double-layer sole. Optionally, the main soles of the first set of soles offering enhanced friction, can be made of a same material as the secondary soles of the first set. Further optionally, the main soles of the second set of soles offering enhanced sliding, can be made of a different material than the secondary soles of the second set.

In some implementations, the first portion of the tank can be a front portion and the second portion is a rear portion.

In another aspect, there is provided an electrolytic tank assembly facilitating alignment and levelling of an electrolytic tank with respect to adjacent electrolytic tanks provided as a row. The electrolytic tank assembly includes a levelling assembly as defined herein, with each adjustable levelling mechanism being independently actuable to cause upward or downward movement of the electrolytic tank.

In some implementations, the electrolytic tank assembly can further include at least four strap assemblies, each strap assembly comprising a vertically extending strap and a connector provided at an end of the vertically extending strap. The connector of each strap assembly can be connected to one adjustable levelling mechanism of the levelling assembly. For example, each connector can include at least one barrel bolt defining a threaded channel, and each foot member of the levelling assembly has a mating threaded portion insertable within one barrel bolt.

In some implementations, the electrolytic tank assembly can further include an anchor assembly being at least partially embedded within a base wall of the electrolytic tank. The anchor assembly can include at least four anchor members defining an anchoring surface being accessible from a lower surface of the base wall of the electrolytic tank, the anchoring surface providing anchorage to the levelling assembly. Optionally, the anchor assembly can further include at least four anchor plates, each anchor plate having an upper surface and a lower surface, the lower surface being connected to one anchor member to distribute a constraint pressure applied to the anchor member within the base wall of the tank. Further optionally, the anchor member can be welded or chemically fixed onto the anchor plate. Further optionally, each anchor member can define a channel providing the anchoring surface for receiving at least a portion of the foot member of one adjustable levelling mechanism. For example, each anchor member can be a barrel bolt, and the lower surface of each anchor plate of the anchor assembly can be connected to three barrel bolts.

In some implementations, the electrolytic tank assembly can further include at least four strap assemblies, each strap assembly comprising a vertically extending strap and a connector provided at an end of the vertically extending strap. The connector of each strap assembly can be connected to one anchor plate of the anchor assembly.

In some implementations, the electrolytic tank assembly can further include a sole assembly as defined herein. Each sole of the sole assembly can be sandwiched between at least one adjustable levelling mechanism and a support beam to selectively allow or prevent transversal movements of the electrolytic tank with respect to the support beam.

In other implementations, the electrolytic tank assembly can further include:

a set of soles configured to provide friction and at least reduce transversal movement of a front portion of the base wall with respect to support beams, each sole of the first set being provided between one support beam and the front portion of the base wall of the tank; and a set of rollers configured to provide sliding and enable transversal movement of a rear portion of the base wall with respect to other support beams, each rollers of the second set being provided between one support beam and the rear portion of the base wall of the tank.

BRIEF DESCRIPTION OF DRAWINGS

Embodiments of the electrolytic tank assembly are represented in and will be further understood in connection with the following figures.

DETAILED DESCRIPTION

The present techniques described herein relate to implementations of an electrolytic tank assembly configured to maintain alignment of adjacent electrolytic tanks within a same row and to facilitate the levelling of each electrolytic tank with respect to an underneath support beam.

It should be noted that a transversal movement herein refers to a forward or backward movement of the electrolytic tank with respect to the support beam, occurring in the x-z plane. A levelling movement herein refers to an upward or downward movement of the electrolytic tank with respect to the support beam, occurring in the x-y plane. It is proposed to adjust the levelling of the electrolytic tank via a levelling assembly cooperating with a base wall of the tank, to support the tank above the support beam. It is further proposed to adjust transversal movement of the electrolytic tank via a sole assembly selectively offering friction or sliding with respect to the support beam.

Levelling Assembly Implementations

Figure 17:
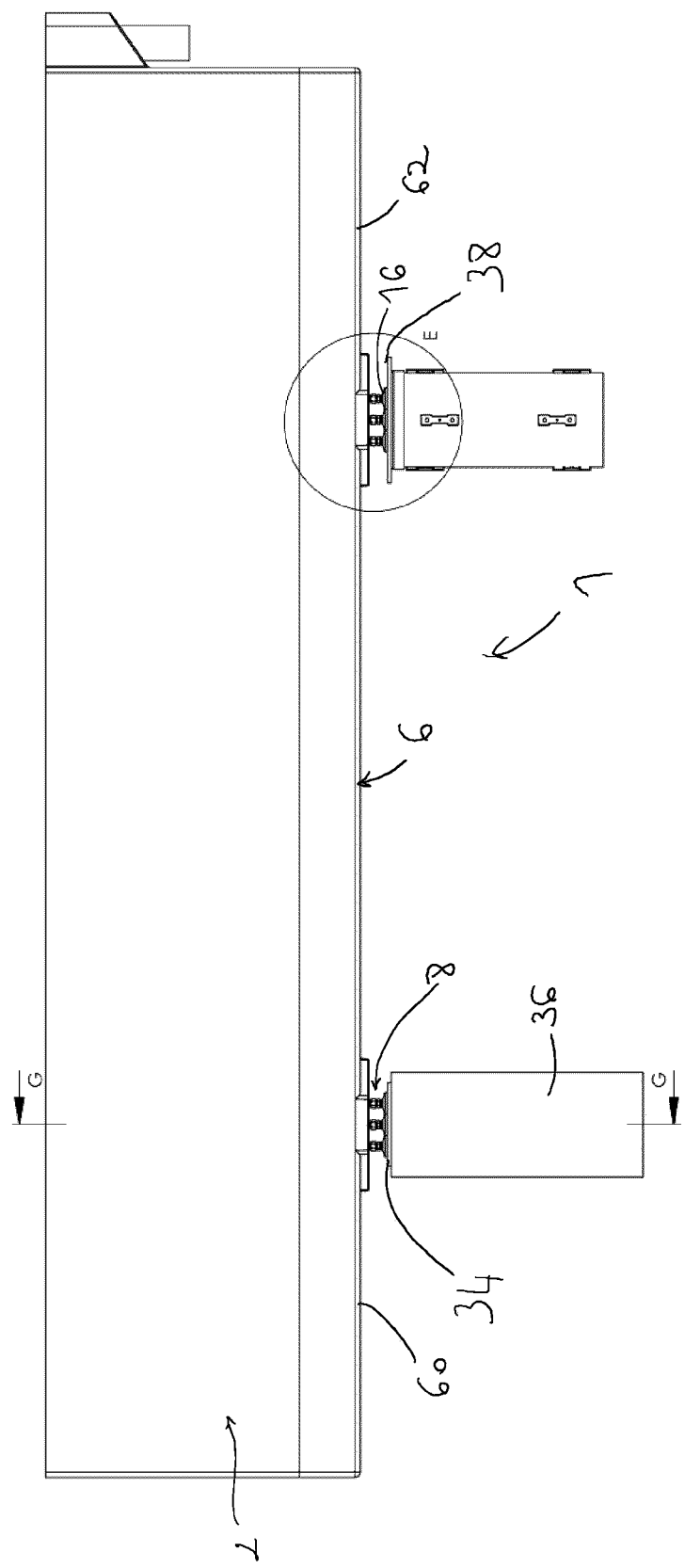
FIG. 17 is a left side view of an implementation of the electrolytic tank assembly including a first set and a second set of soles provided between the electrolytic tank and corresponding support beams.
Figure 18:
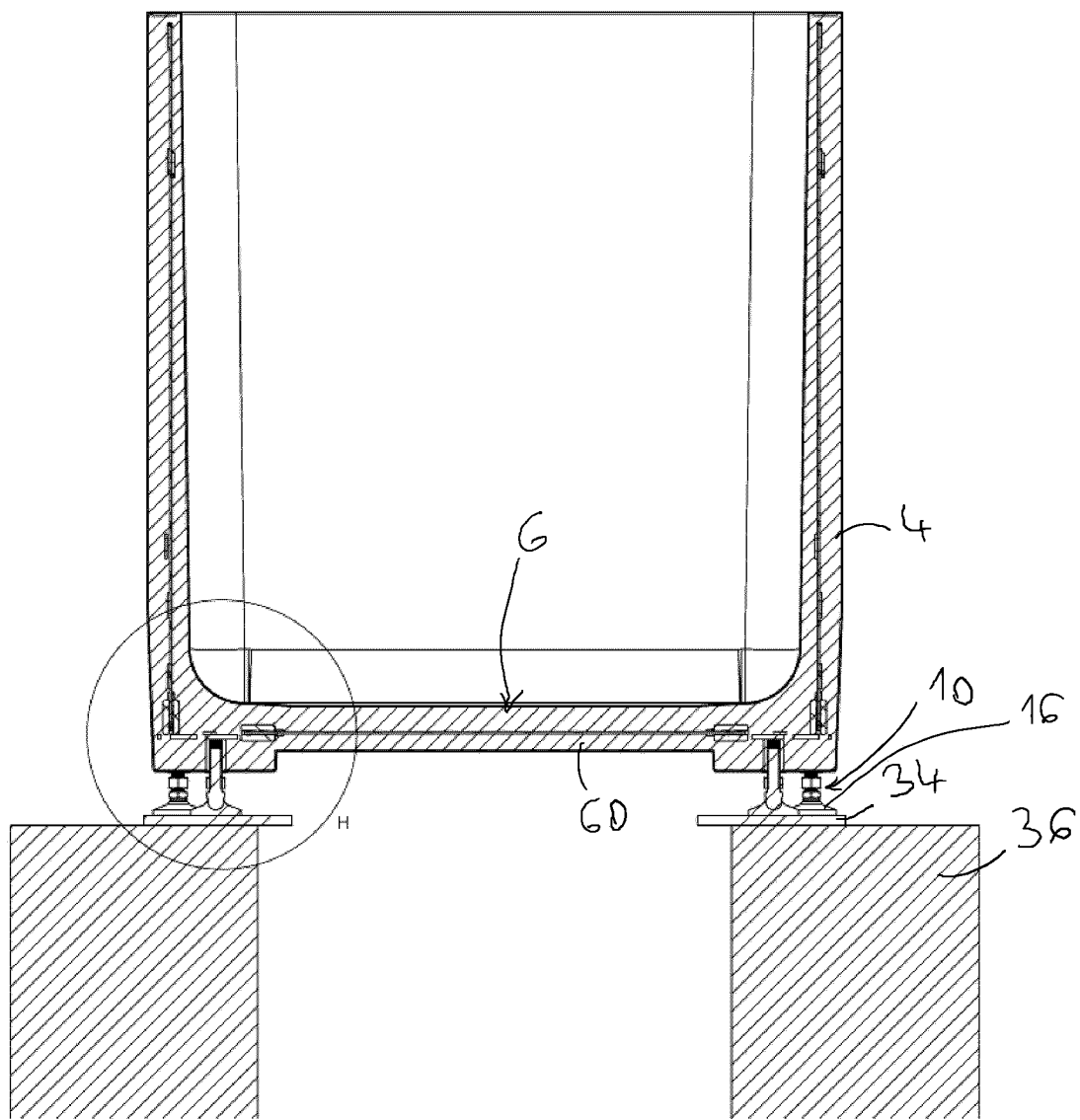
FIG. 18 is a cross-sectional view of FIG. 17 along a width of a front portion of the tank as per line G-G.

Referring to FIGS. 17 and 18, the electrolytic tank assembly (1) includes a tank (2) having side walls (4) extending upwardly from a base wall (6, not seen in FIG. 4) to define a cavity, which is sized to receive an electrolytic bath and electrodes plunging in the electrolytic bath. The electrolytic tank assembly (1) further includes a levelling assembly (8) operatively connected to the base wall (6) to adjust a height of the tank (2) with respect to support beams (36) on which the tank (2) relies.

Figure 1:
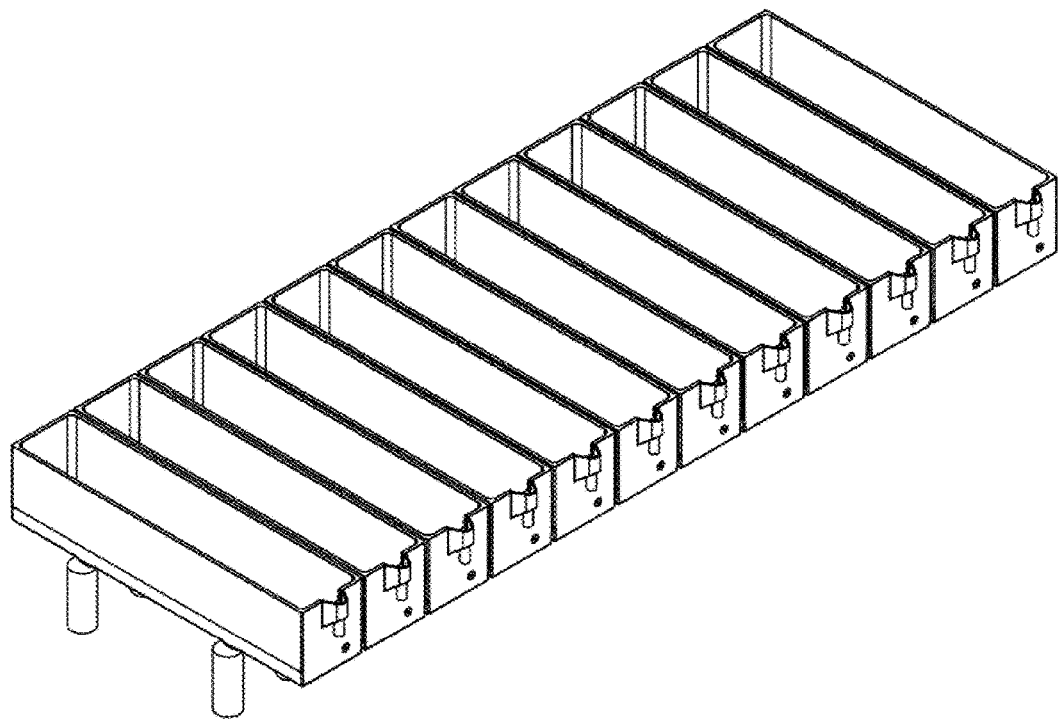
FIG. 1 is a top and left side elevational view of a row of electrolytic tanks, each electrolytic tank having a base supported on four vertical support beams organised in two opposed rows (PRIOR ART).
Figure 2:
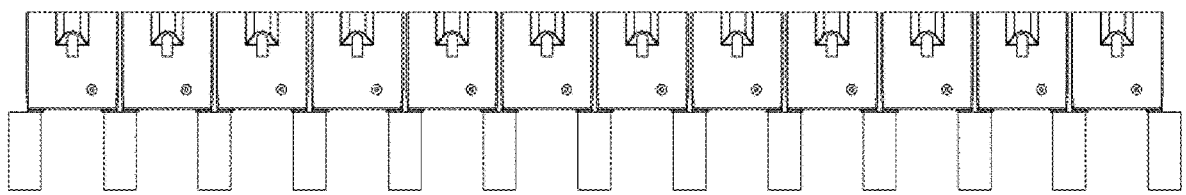
FIG. 2 is a front view of the row of electrolytic tank of FIG. 1 (PRIOR ART).
Figure 3:
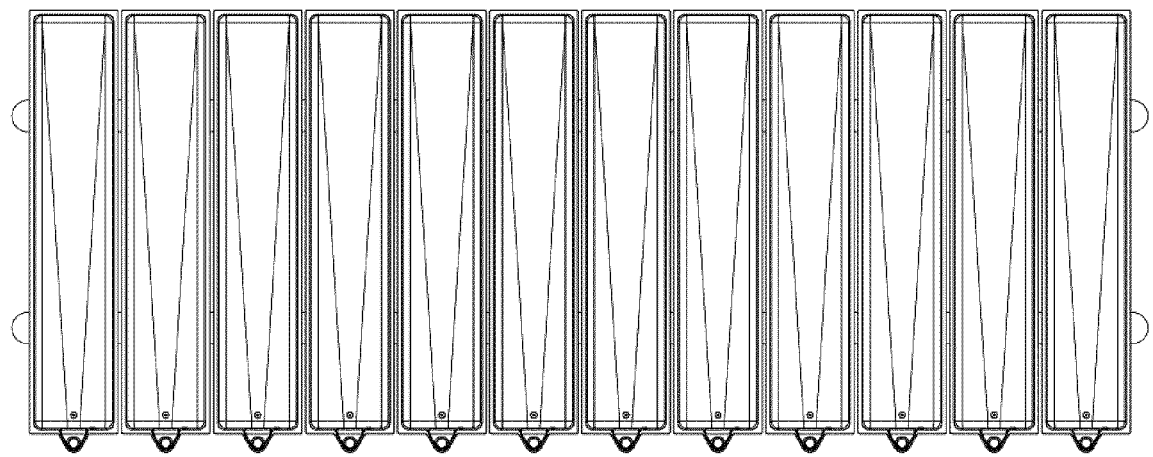
FIG. 3 is a top view of the row of electrolytic tank of FIG. 1 (PRIOR ART).
Figure 4:
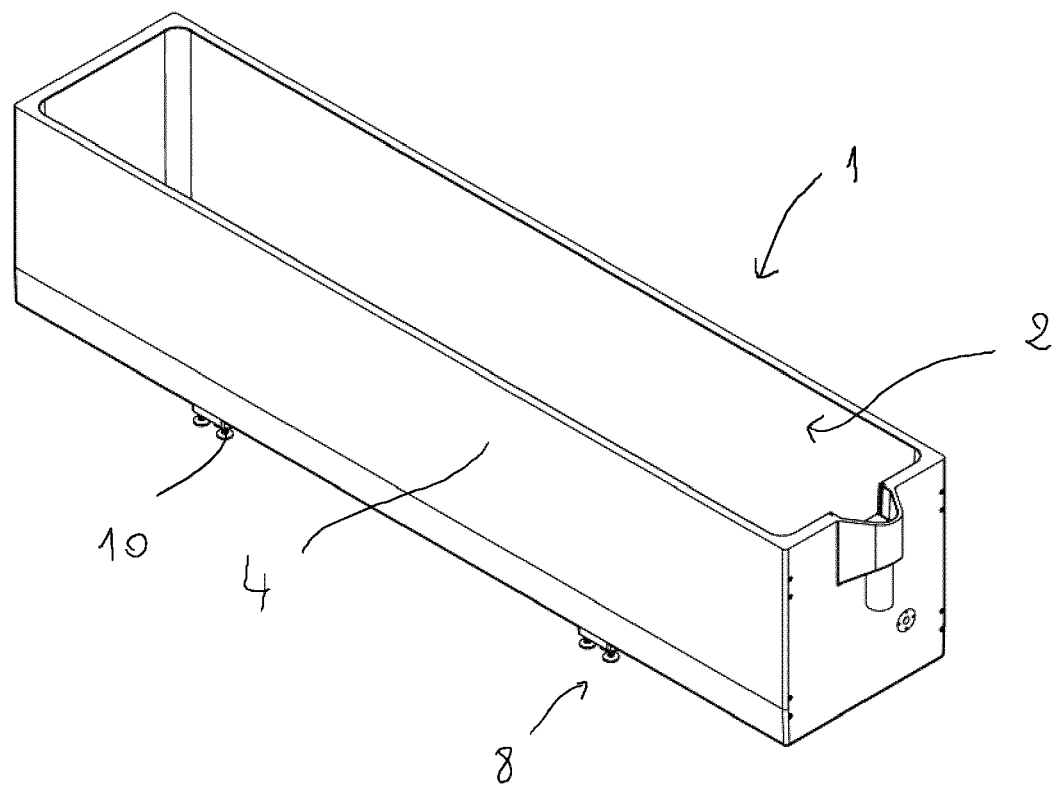
FIG. 4 is a top and left side elevational view of an implementation of the electrolytic tank assembly including an adjustable levelling mechanism.
Figure 5:
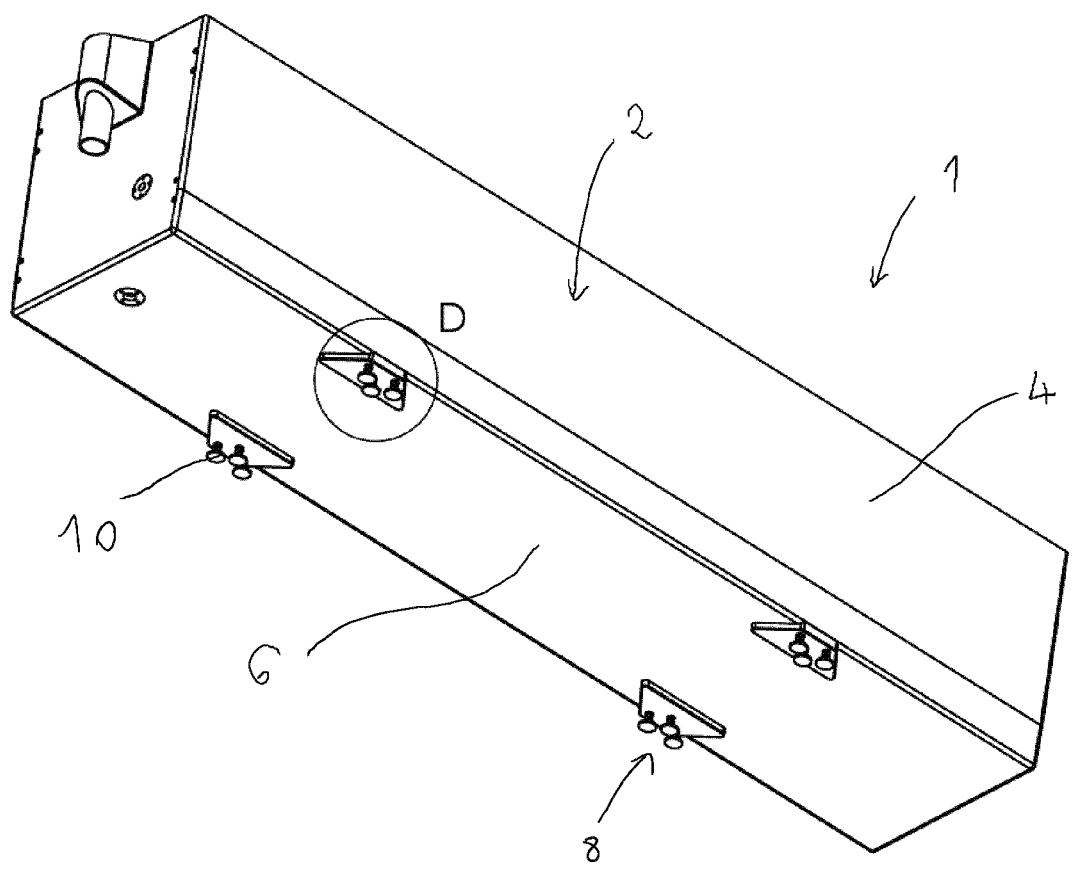
FIG. 5 is a bottom and right side elevational view of the electrolytic tank assembly of FIG. 4.

In some implementations, the levelling assembly includes at least one adjustable levelling mechanism per support beam located underneath the electrolytic tank. For example, for an electrolytic tank to be placed on four support beams, the levelling assembly can include at least four levelling mechanisms (corresponding to at least one levelling mechanism per support beam). However, a plurality of levelling mechanism(s) can be gathered as clusters and provided at opposed edge portions of the base wall of the tank to provide additional adjustment options. FIGS. 4 and 5 illustrate an implementation of the tank assembly (1) wherein the levelling assembly (8) includes a plurality of adjustable levelling mechanisms (10) organized as four spaced-apart clusters, and each opposed edge portions of the base wall (6) being provided with two spaced-apart groups of adjustable levelling mechanisms (10). Implementations illustrated in the Figures include for example three adjustable levelling mechanisms (10) per cluster supporting a tank portion above each support beam (36). However, it should be understood that the number and position of the adjustable levelling mechanisms (10) included in the levelling assembly (8) can vary depending on the size, weight and support configuration of the electrolytic tank (2), and on the number of support beams (36) located underneath the electrolytic tank (2).

Figure 6:
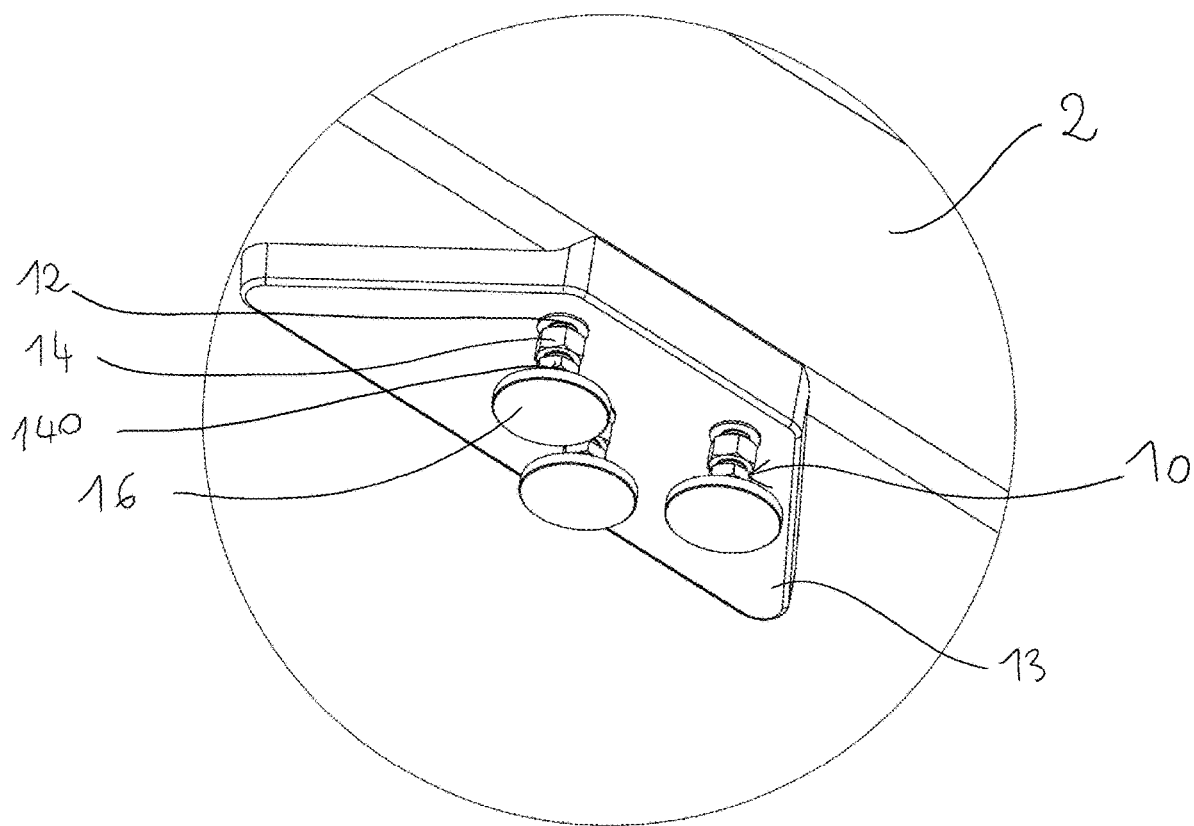
FIG. 6 is a zoomed view of a portion of FIG. 5 showing three adjustable levelling mechanisms cooperating with a base wall of the electrolytic tank.
Figure 7:
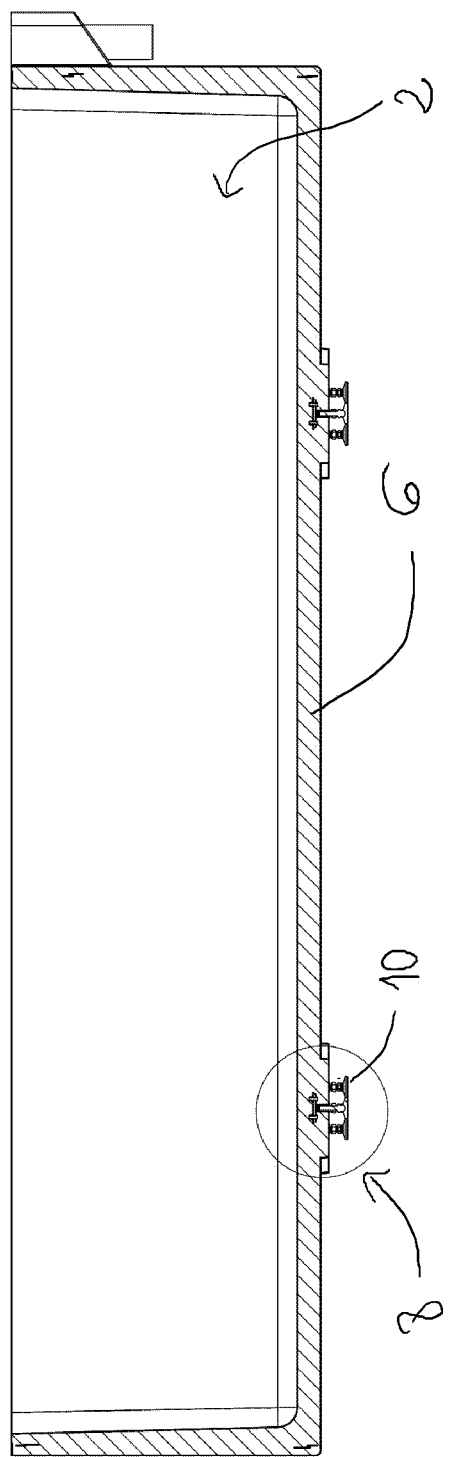
FIG. 7 is a cross-sectional view along a length of the electrolytic tank of FIG. 4.
Figure 8:
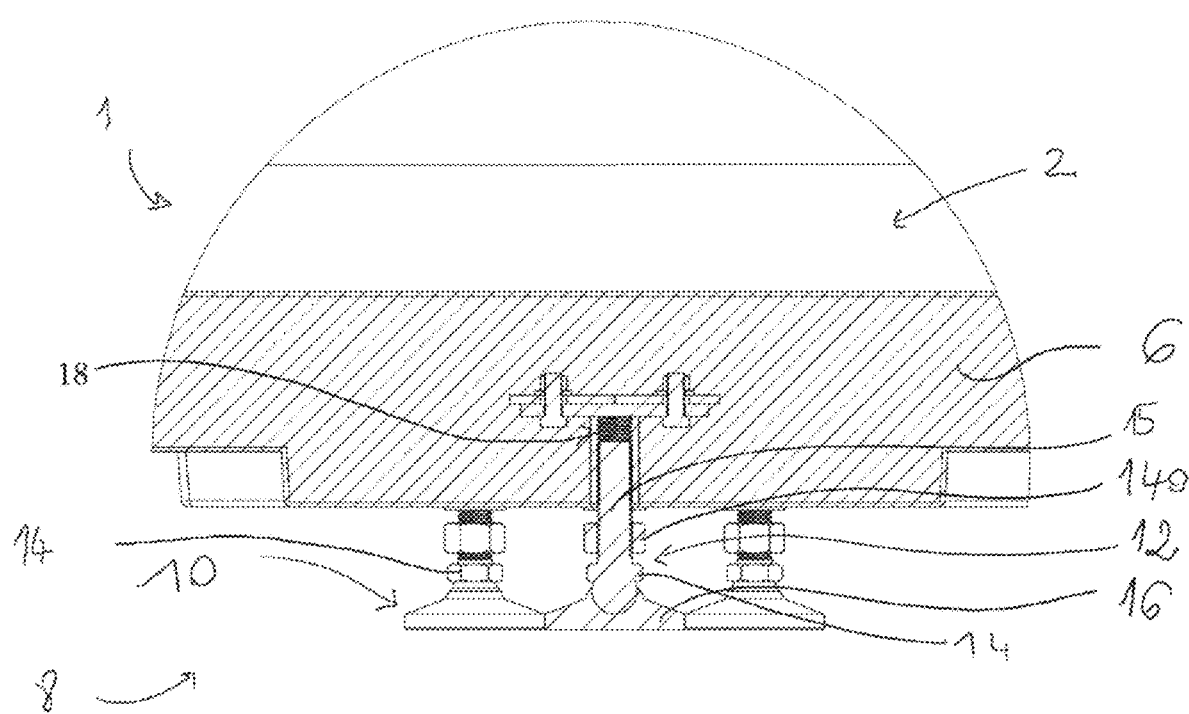
FIG. 8 is a zoomed view of a portion of FIG. 7 showing three adjustable levelling mechanisms cooperating with a base wall of the electrolytic tank.

Referring to FIGS. 6 to 8, each adjustable levelling mechanism (10) includes a foot member (12) operatively connected to a lower surface of the base wall (6) of the tank (2) and supporting the tank (2) at a given height above the support beam (not illustrated in FIGS. 6 to 8).

Implementations of the tank assembly (1) illustrated in FIG. 6, for example, include optional foot protrusions (13) extending downwardly from the base wall and receiving the foot members (12) of the adjustable levelling mechanisms (10). As readily understood by one skilled in the art, design of the tank (2) and its base wall may vary from the one illustrated in the Figures as long as the base wall is sized and shaped to receive the foot member (12) of each adjustable levelling mechanism (10).

Figure 25:
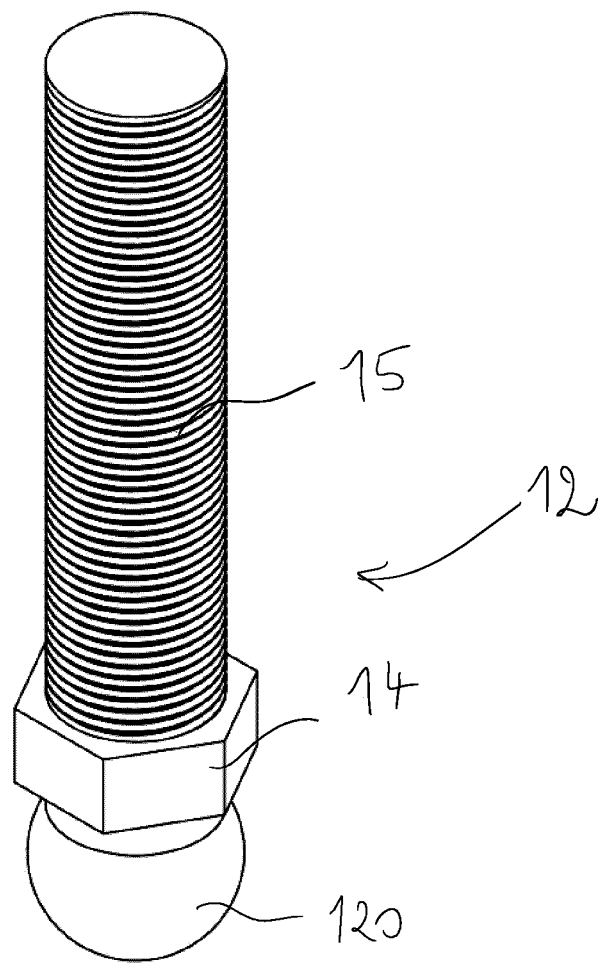
FIG. 25 is a top elevational view of a bolt having a threaded portion and a nut, acting as foot member and levelling member of an adjustable levelling mechanism.

Referring to FIGS. 8 and 25, each adjustable levelling mechanism (10) further includes a levelling member (14) which is configured to cooperate with the foot member (12) to vary the position of the latter (12) with respect to the tank (2), thereby changing the height of the tank (2) with respect to a corresponding support beam. In the implementation illustrated in FIGS. 8 and 25, the foot member (12) of the adjustable levelling assembly (10) is a bolt having a threaded portion (15) received, at least partially, in the lower surface of the base wall (6). The levelling member (14), shaped as a nut, can form a one-piece structure with the foot member (12) and serve as a grip portion. Rotation of the levelling member (14) actuates the rotation of the foot member (12) to vary a length of the threaded portion (15) protruding from the base wall (6), thereby varying the height at which the tank (2) is supported above the support beams (not seen in FIG. 8). For example, counter clockwise rotation of the levelling member (14) decreases the height at which the tank (2) is supported above the support beams, and clockwise rotation of the levelling member (14) enables to increase the length of the threaded portion (15) protruding from the base wall (6), thereby increasing the height at which the tank (2) is supported above the support beams.

It should be noted that the adjustable levelling mechanism can further include one or more secondary nut(s). For example, as seen in FIGS. 6 and 8, a secondary nut (140) can be rotated along threads of the threaded portion (15) of the foot member (12) until abutting a lower surface of the base wall (6) to avoid further rotation of the foot member (12) with respect to the tank (2).

The levelling member and the foot member of the adjustable levelling mechanism can differ from the illustrated implementations, as long as actuation of the levelling member leads to upward or downward movements of the foot member. For example, the levelling member and the foot member can be separate pieces, which can be inserted, screwed, welded and/or chemically fixed. One skilled in the art will readily understand how to adapt other types of mechanisms to fulfill levelling of the tank with respect to the support beams. For example, a hydraulic or pneumatic piston could be used as an adjustable levelling mechanism to allow variation of the height of the tank with respect to the support beams.

Figure 26:
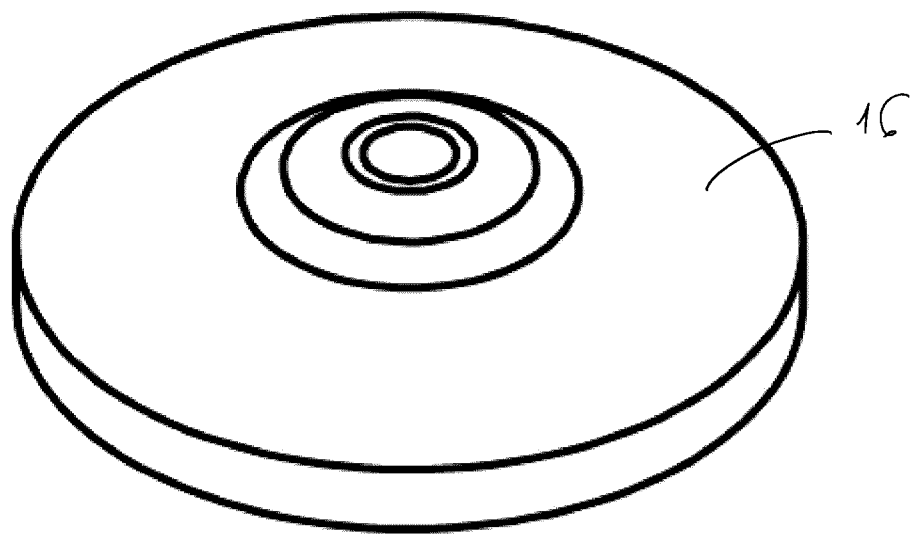
FIG. 26 is a top elevational view of a capping member of an adjustable levelling mechanism.
Figure 27:
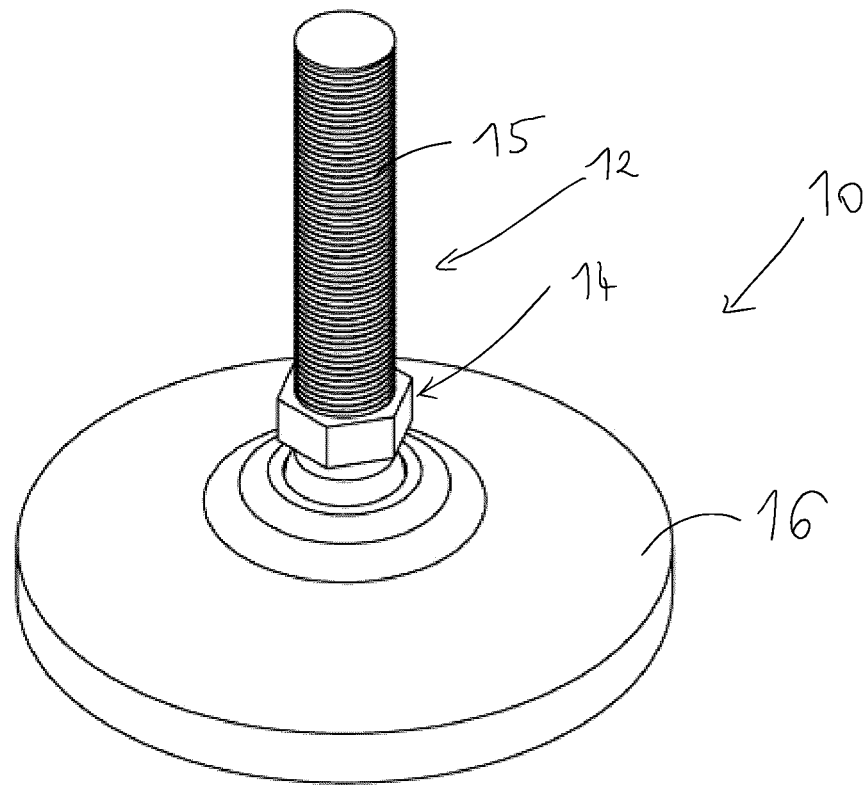
FIG. 27 is a top elevational view of the bolt and nut configuration of FIG. 25 engaged in the capping member of FIG. 26, thereby forming an adjustable levelling mechanism to be connected to the base wall of an electrolytic tank.
Figure 28:
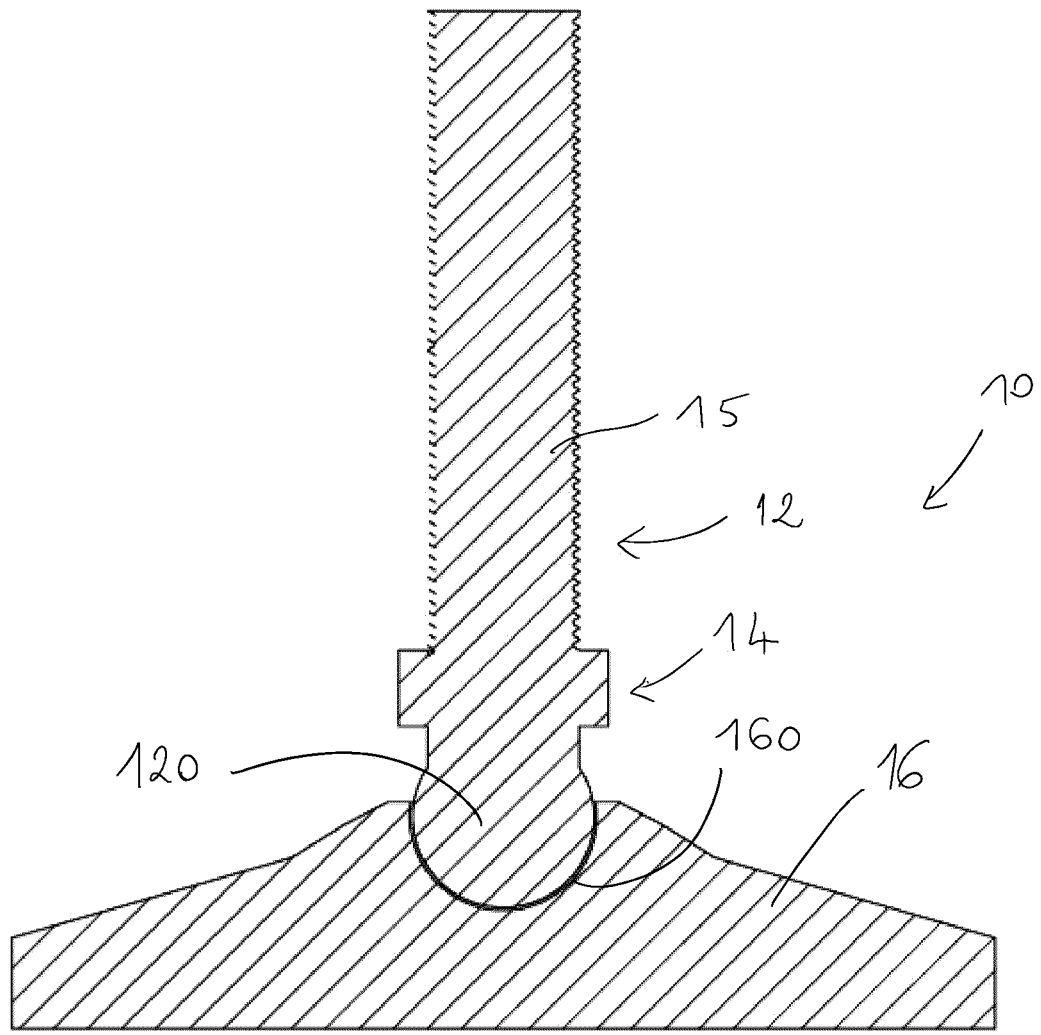
FIG. 28 is a cross-sectional view of the adjustable levelling mechanism of FIG. 27.

Additionally, referring to FIGS. 26 to 28, the adjustable levelling mechanism (10) can further include a capping member (16) having an upper surface configured to cooperate with an end portion (120) of the foot member (12), and a lower planar surface being sized to distribute the applied weight of the tank (2). As better seen in FIG. 28, the upper surface of the capping member (16) may be recessed to encase the end portion (120) of the foot member (12) and to allow pivoting of said end portion with respect to the capping member (16) to accommodate uneven ground. For example, the end portion (120) of each bolt (12) is of spherical shape and engageable within a corresponding spherical recess (160) of the capping member (16) to ensure pivotal movements around a vertical axis.

The capping member can be chosen to have a cross section significantly higher than the cross section of the foot member to reduce the weight applied to a corresponding section of the below support beam. The foot member can be inserted into, screwed into, welded to and/or chemically fixed to the capping member. In some implementations, the capping member can be made of a metallic material to provide strength and durability like stainless steel to resist chemical corrosion. In implementations differing from the ones illustrated in the Figures, a same capping member can receive the end portion of a plurality of foot members. For example, one larger capping member could be used to cap the end portion of the three foot members (12) from FIG. 6, instead of the three smaller capping members (16). In implementations differing from the ones illustrated in the Figures, the foot member can directly contact the support beam in absence of a capping member.

In some implementations, the electrolytic tank assembly can further include an anchor assembly for providing anchorage to the levelling assembly. The anchor assembly can include an anchor member embedded within the base wall of the tank and configured to offer an anchoring surface or cavity to which the foot member of the levelling assembly is anchored. The anchor member is configured to receive the foot member and allows displacement of the foot member with respect to the tank for levelling thereof.

Figure 10:
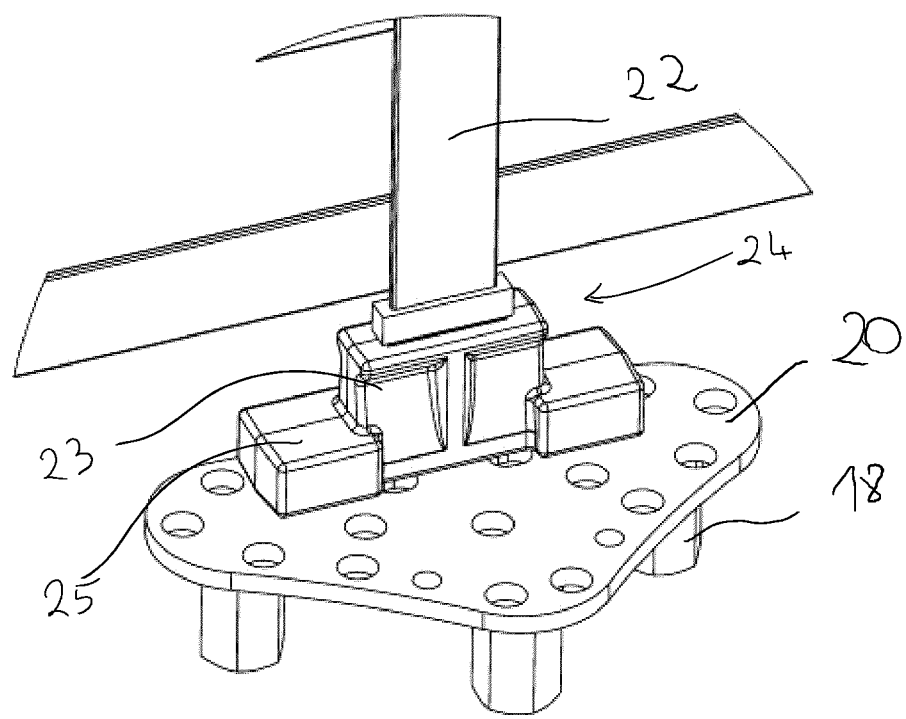
FIG. 10 is a zoomed view of a portion of FIG. 9 showing a portion of a vertical reinforcing strap connected to a T-shaped hook which is itself welded to an anchor member including threaded bores.
Figure 11:
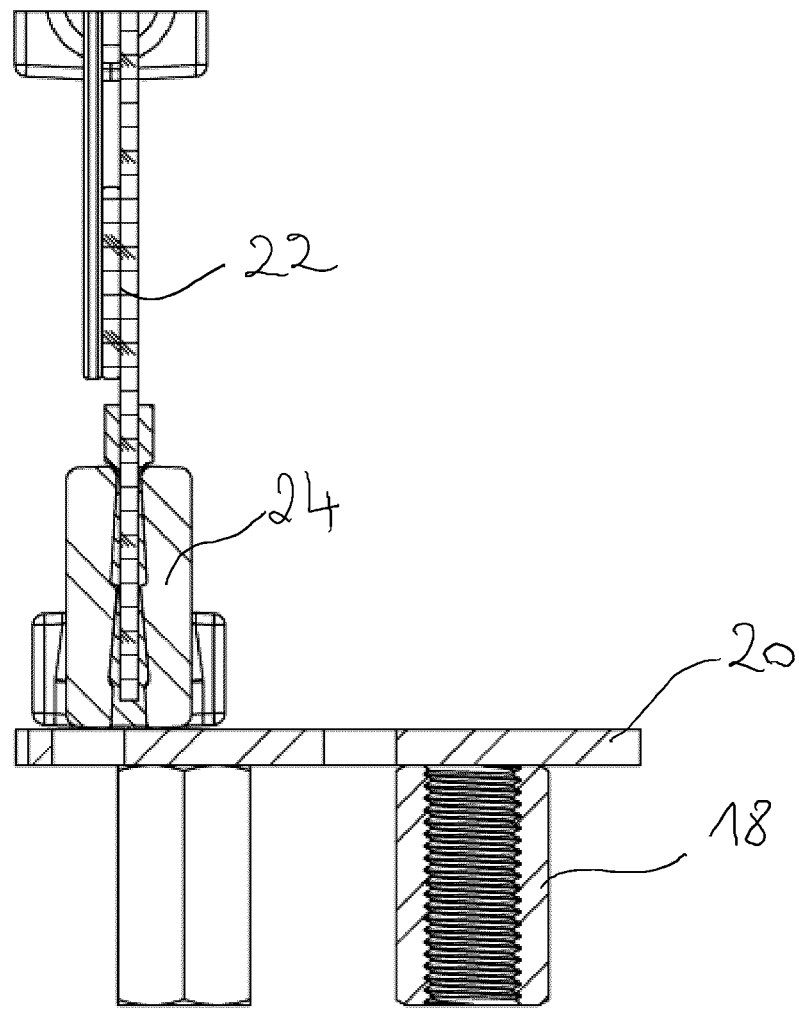
FIG. 11 is a cross-sectional view of FIG. 10 showing the cavity of one threaded bore of the anchor member.
Figure 12:
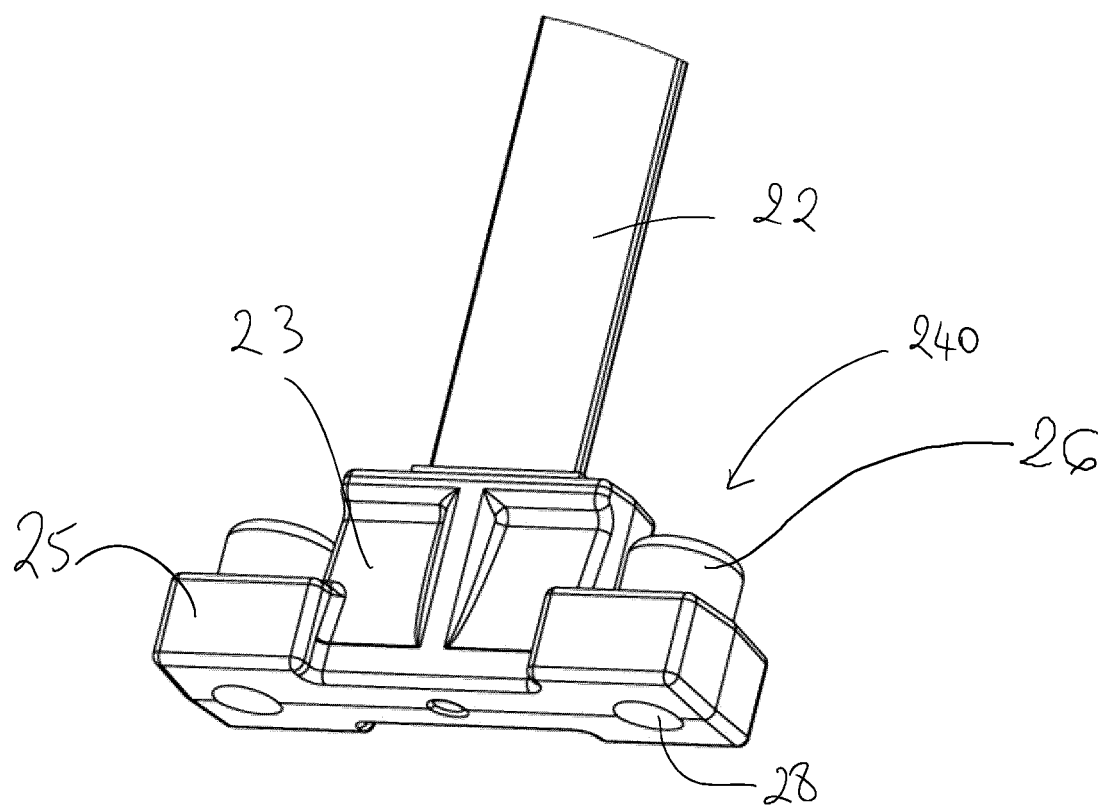
FIG. 12 is a bottom and front side elevational view of a portion of a reinforcing strap inserted into a T-shaped hook including two threaded bores serving as anchor members.

Referring to FIG. 8, the anchor member (18) can be a bore, such as a barrel bolt, which is threaded to engage the mating bolt serving as foot member (12). A length of the bore or barrel (18) can be chosen to provide room for insertion of a portion or a whole length of the threaded portion (15) of the foot member (12), depending on the given height of the tank with respect to the support beam. Referring to FIGS. 10 and 11, the anchor member (18) can be a barrel bolt which is welded to an anchor plate (20), thereby distributing the constraint pressure applied via the barrel bolt (18) within the base wall of the tank (not illustrated in FIGS. 10 and 11). One anchor plate (20) can be connected to several anchor members (18), such as three anchor members (18) as seen on FIGS. 10 and 11. Again, one skilled in the art will readily understand that implementations of the anchor member can vary according to the type of foot member and differ from what is illustrated in the Figures.

Sole Assembly Implementations

In another aspect, the electrolytic tank assembly includes a sole assembly controlling transversal movements of the electrolytic tank with respect to the support beams and with respect to another adjacent electrolytic tank.

The sole assembly can include a first set of a plurality of soles. Referring to FIGS. 17 and 18, the first set of soles (34) is placed between each support beam (36) and a corresponding front portion (60) of the base wall (6) of the tank (2). The first set of soles (34) is configured to provide friction and avoid (or at least reduce) transversal movement of the front portion (60) of the base wall (6) with respect to the corresponding support beam (36).

Figure 19:
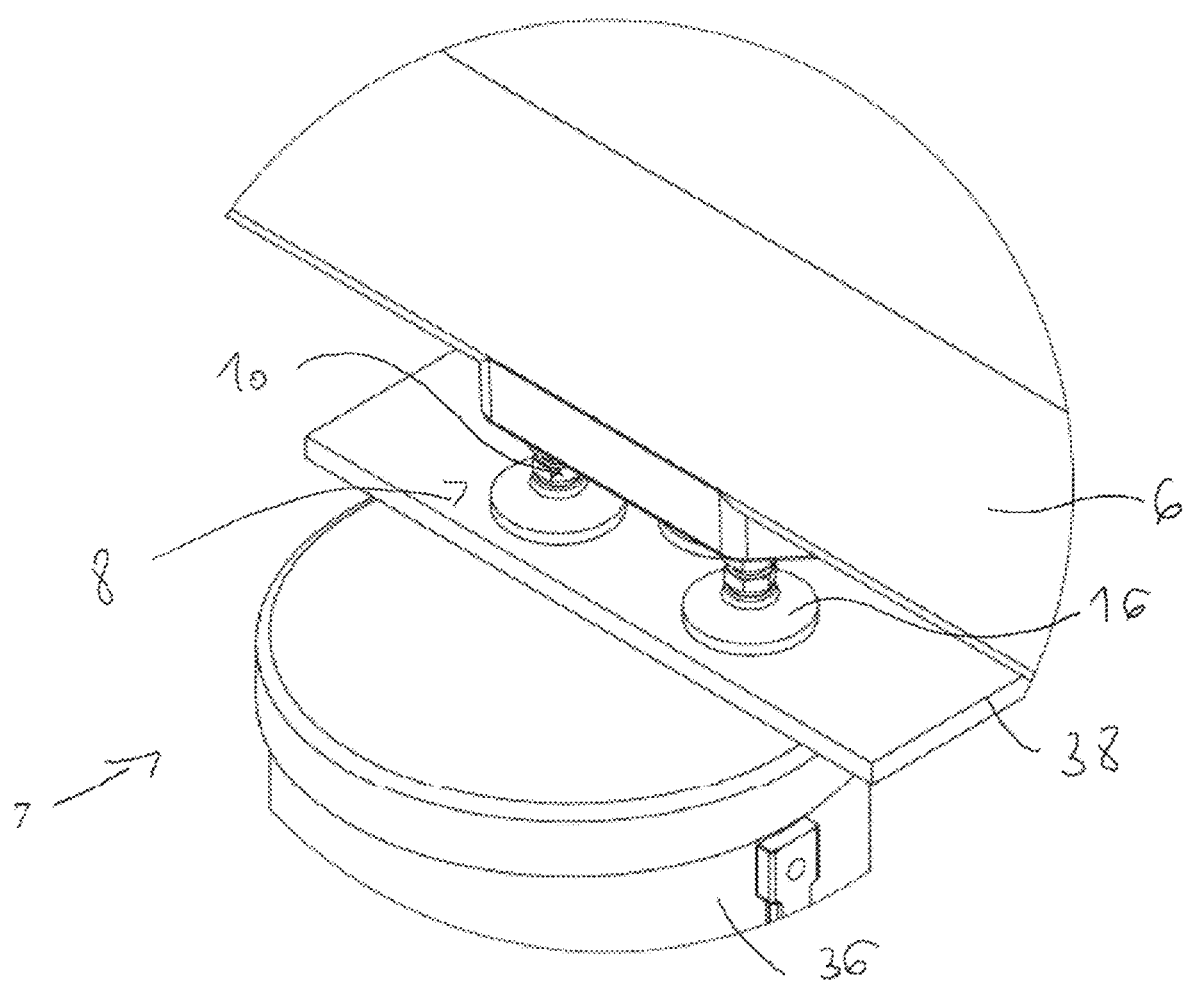
FIG. 19 is a top and left side elevational view of a portion of FIG. 17 showing a sole sandwiched between three levelling mechanisms connected to a rear portion of the tank and a corresponding support beam.

The sole assembly can further include a second set of a plurality of soles. Referring to FIGS. 17 and 19, the second set of soles (38) is placed between each support beam (36) and a corresponding rear portion (62) of the base wall (6) of the tank (2). The second set of soles (38) is configured to provide sliding and to enable transversal movement of the rear portion (62) of the base wall (6) with respect to the corresponding support beam (36).

Referring to FIGS. 17 and 18, each sole (34) of the first set is sandwiched between an upper surface of a support beam (36) and a lower surface of three capping members (16) of the corresponding adjustable levelling mechanisms (10). Material of the sole (34) from the first set is selected to prevent or at least reduce transversal movement of the front portion (60) of the base wall (6) with respect to the support beam (36). For example, each sole of the first set can be made of, or at least have a surface made of, a material offering a high kinetic friction coefficient, including rubber-based materials, such as EPDM rubber.

Referring to FIGS. 17 and 19, each sole (38) of the second set is sandwiched between an upper surface of a support beam (36) and a lower surface of three capping members (16) of the corresponding adjustable levelling mechanisms (10). Material of the sole (38) from the second set is selected to allow transversal movement of the rear portion (62) of the base wall (6) with respect to the support beam (36). For example, each sole of the second set can be made of, or at least have a surface made of, a material offering a low kinetic friction coefficient, including polymeric materials such as Teflon®, Celcon®, Selkon, HMWHDPE, HDPE, polyethylene, polypropylene, nylon, or any equivalents thereof.

Optionally, as better seen on FIGS. 18 and 19, the soles (34 and 38) may be sized and shaped such that a portion thereof contacts at least a portion of the upper surface of the support beam (36), and that another portion thereof extends away from the upper surface of the support beam (36). As better seen in FIG. 17, the size and shape of each sole from the first set of soles (34) can differ from the size and shape of each sole from the second set of soles (38).

Figure 20:
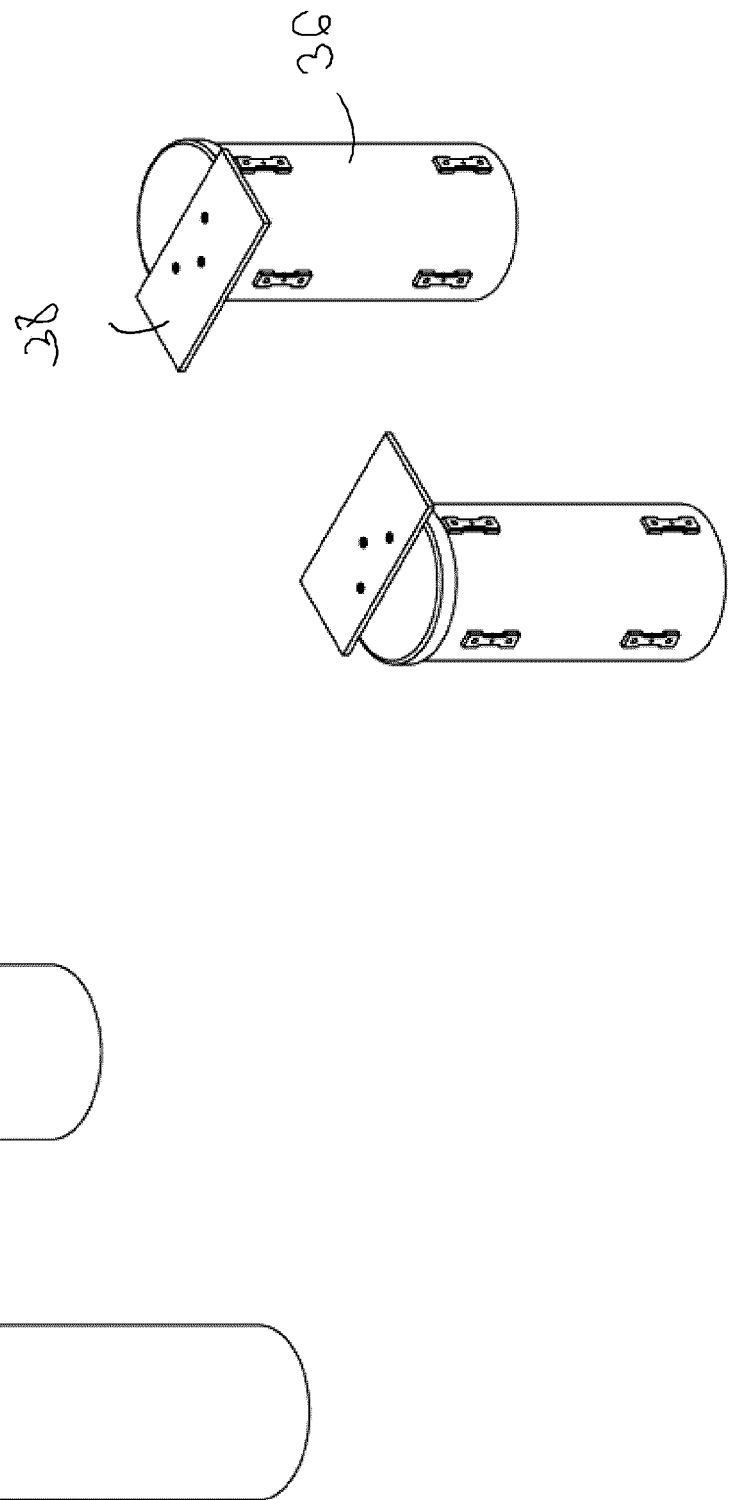
FIG. 20 is a top and left side elevational view of two opposed pairs of support beams onto which is anchored respective first pair of soles and second pair of soles for controlled transversal movement of the electrolytic tank with respect to the support beams.
Figure 21:
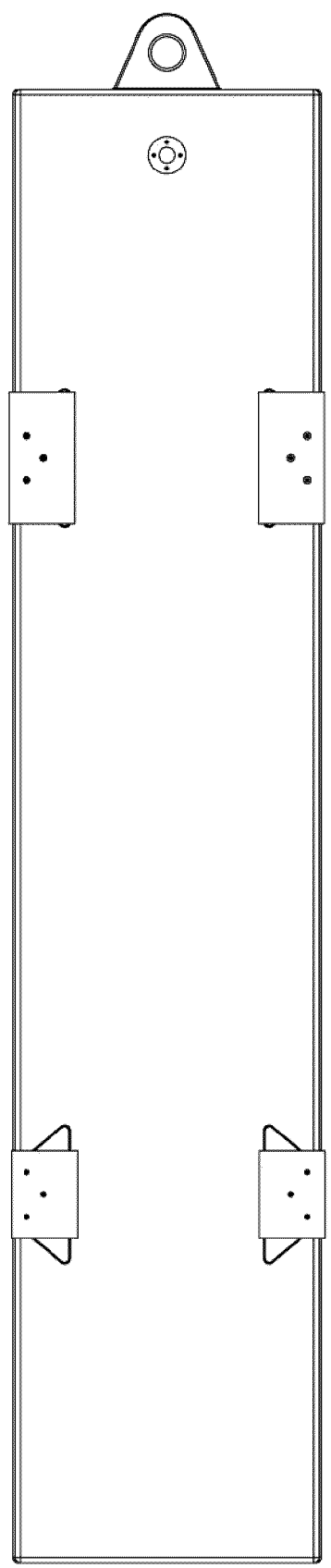
FIG. 21 is a bottom view of the electrolytic tank onto which is anchored respective first pair of soles and second pair of soles for controlled transversal movement of the electrolytic tank with respect to support beams.
Figure 22:
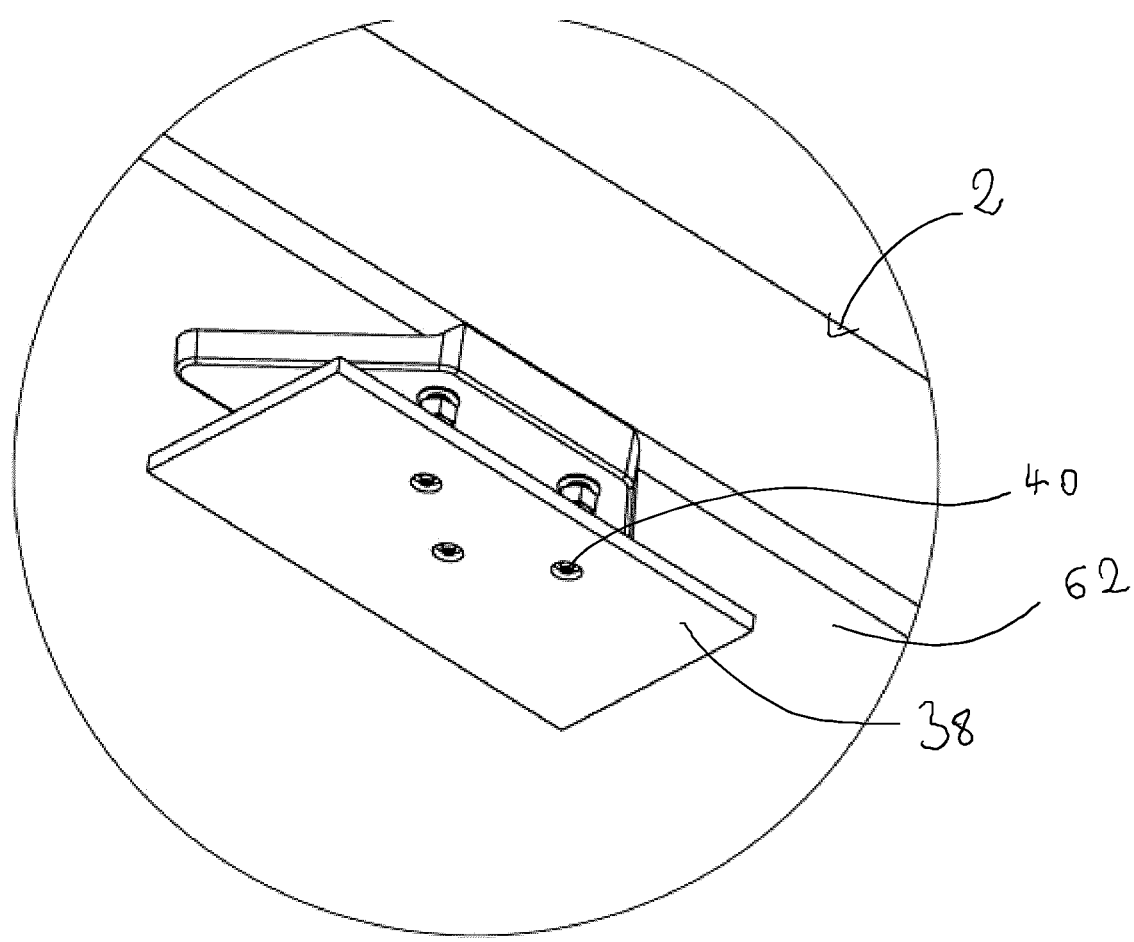
FIG. 22 is a zoomed bottom and left side elevational view of a portion of FIG. 21 showing one sole of the second pair of soles screwed to the electrolytic tank via the adjustable levelling mechanisms.
Figure 23:
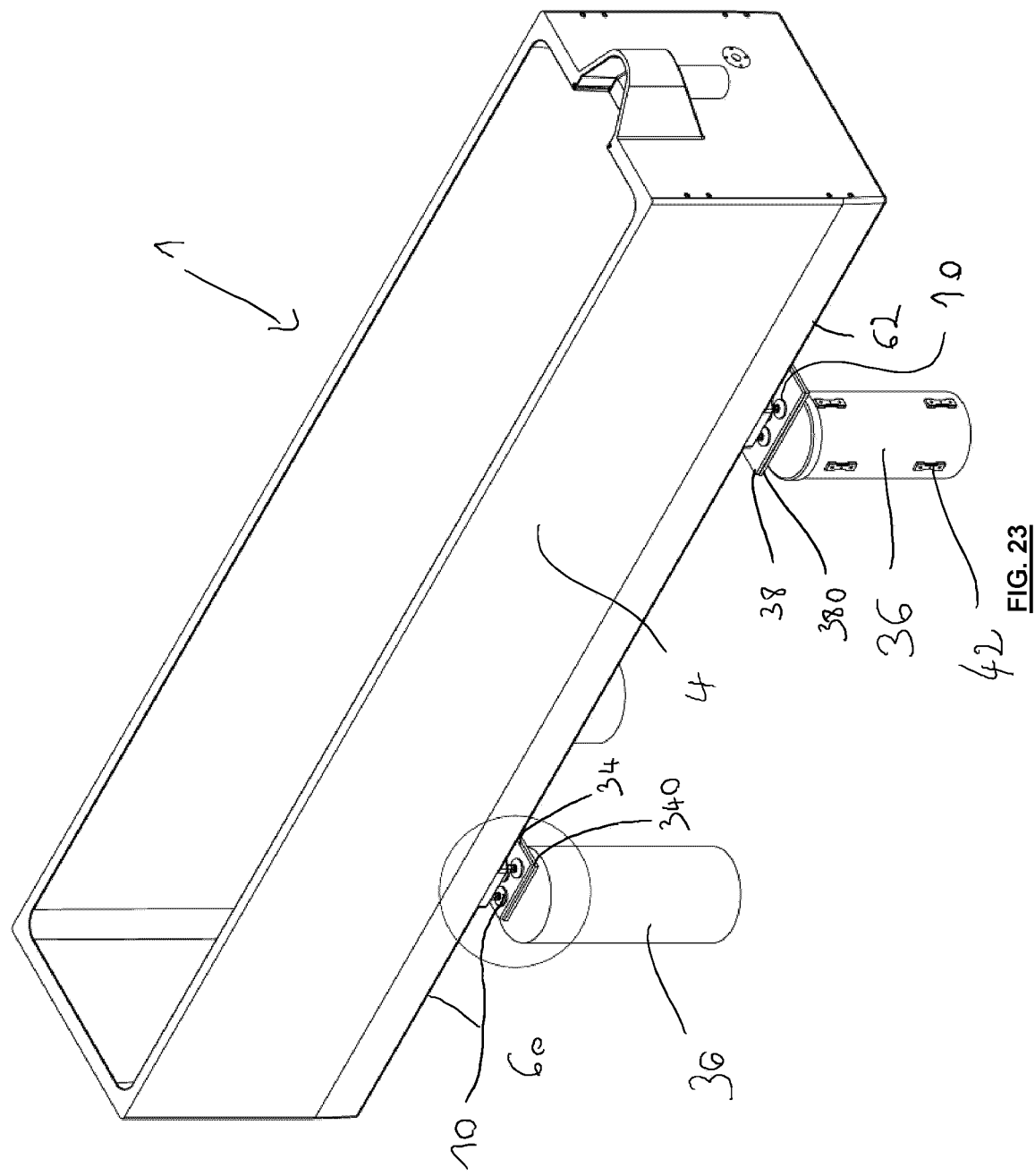
FIG. 23 is a top and left side elevational view of another implementation of the electrolytic tank assembly including a first set and a second set of soles provided between the electrolytic tank and corresponding support beams, each set including two pairs of a main sole and a secondary sole.
Figure 24:
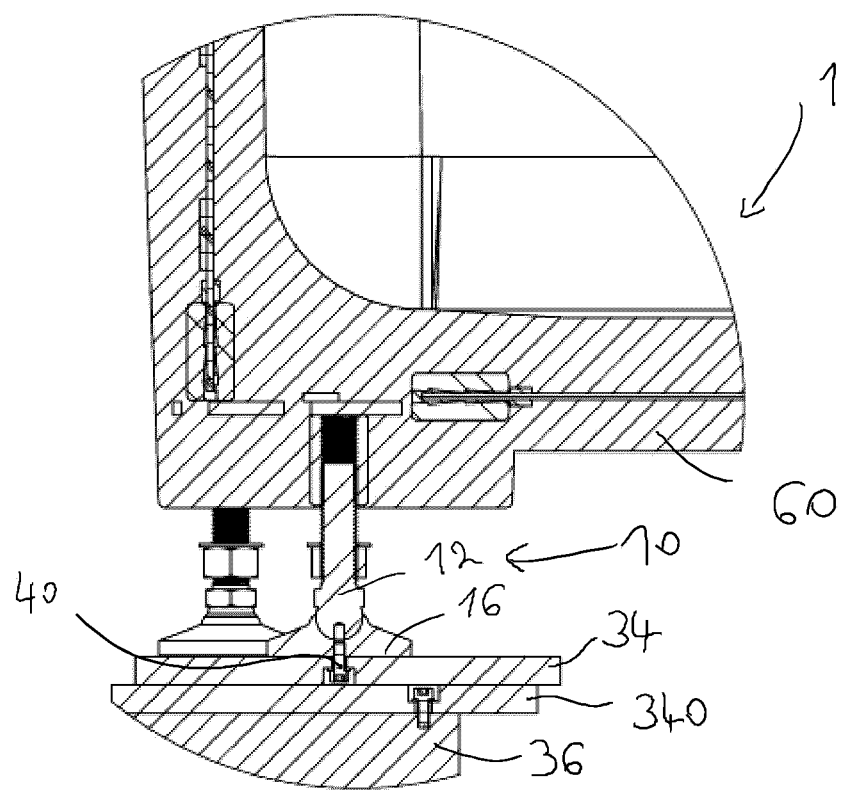
FIG. 24 is cross-sectional view of a portion of FIG. 23 along a width of the tank, showing the main sole and the secondary sole provided between a front portion of the base wall of the tank and a corresponding support beam.

FIGS. 17 to 24 show different implementations of the sole assembly provide selective friction and sliding between portions of the tank and a support beam. The soles from each of the first and second sets can be simply placed onto the upper surface of the support beam as seen on FIGS. 17 to 19, can be anchored (by welding, gluing, riveting, or screwing) to the upper surface of the support beam as seen in FIG. 20, or to the electrolytic tank as seen on FIGS. 21 and 22. In some other implementations, a secondary sole (340 or 380) can be layering the main sole (34 or 38), as seen in FIGS. 23 and 24. Anchoring the soles avoids movements thereof with respect to tank or support beam and avoid falling off of the support beam.

Referring to FIGS. 22 and 24, each sole of the first and second sets (34 or 38) can be secured to the corresponding adjustable levelling mechanism(s) (10) via a fastening element (40). The fastening element (40) can be screwed, crimped or riveted into the foot member (12) of the adjustable levelling mechanism (10) for example.

It should be noted that in the case wherein a levelling mechanism is not provided at a lower surface of the tank, each sole of the first and second sets can be secured directly to a lower surface of the tank.

Referring to FIGS. 23 and 24, a secondary sole is paired with each sole of the first and second sets (34 and 38), which are referred to as the main soles. The main sole (34) of the first set is layered with the secondary sole (340) of the first set, thereby forming a first double-layer sole which is placed above each support beam and under the levelling mechanisms (10) supporting the front portion (60) of the base wall. Similarly, the main sole (38) of the second set is layered with the secondary sole (380) of the second set, thereby forming a second double-layer sole which is placed above each support beam and under the adjustable levelling mechanisms (10) supporting the rear portion (62) of the base wall (6). The main soles (34, 38) can be secured to the adjustable levelling mechanisms (10) of the tank assembly (1) and the secondary soles (340, 380) can be secured to the corresponding support beam (36).

It should be noted that the size of the main sole can be different from the size of the secondary sole such that only portions thereof are overlapping. The nature of the material of the main sole can also differ from the one of the secondary sole. For example, for the first set of soles offering enhanced friction, the main sole and the secondary sole can be made of a same material. In contrast, for the second set of soles offering enhanced sliding, the main sole and the secondary sole can be made of different materials.

One skilled in the art will readily understand that the thickness and material of the soles from respective front set and rear set can be chosen to avoid deformation or perforation of the sole with the foot member of the adjustable levelling mechanisms. Also, the capping member of the levelling mechanism can be sized and shaped to reduce such deformation or perforation risks for the sole.

In other implementations, the sole assembly can include various mechanisms providing sliding of the tank with respect to the support beam (referred to, for instance, as sliding assemblies), which can be used in place of the second set of soles as described previously. For example, referring to FIGS. 29 to 33, the sliding assembly can include spaced-apart pairs of wheels or rollers (44) which are respectively connected to the two opposed edge portions of the rear portion (62) of the base wall (6), to allow transversal movement of said rear portion (62) during expansion or contraction thereof. One skilled in the art would readily understand that the width of the roller can vary depending on the configuration of the connected adjustable levelling assembly.

Figure 29:
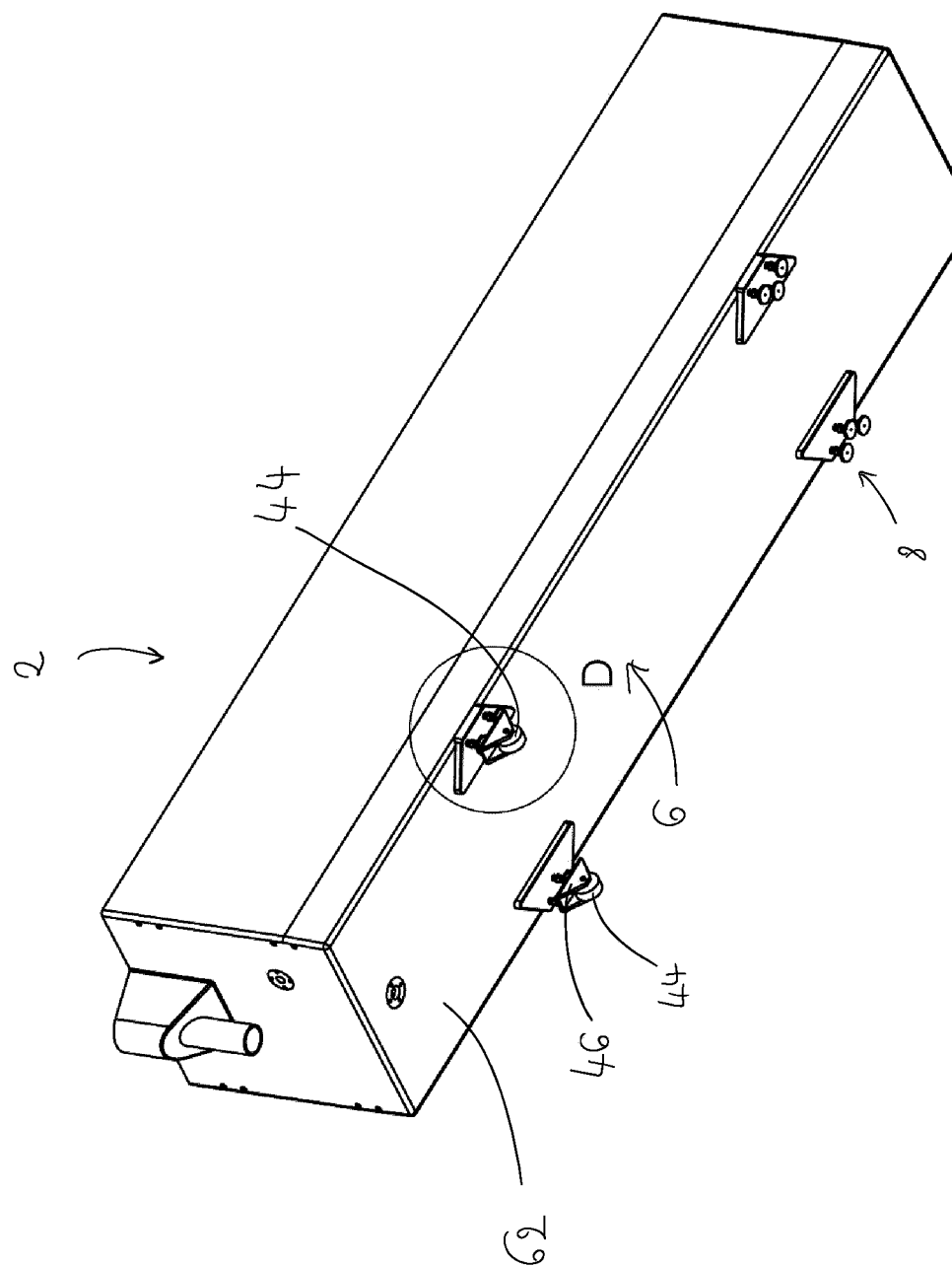
FIG. 29 is a bottom and right elevational view of an electrolytic tank equipped with adjustable levelling mechanisms and a sliding assembly including a pair of rollers at one end portion of the base wall of the tank.
Figure 30:
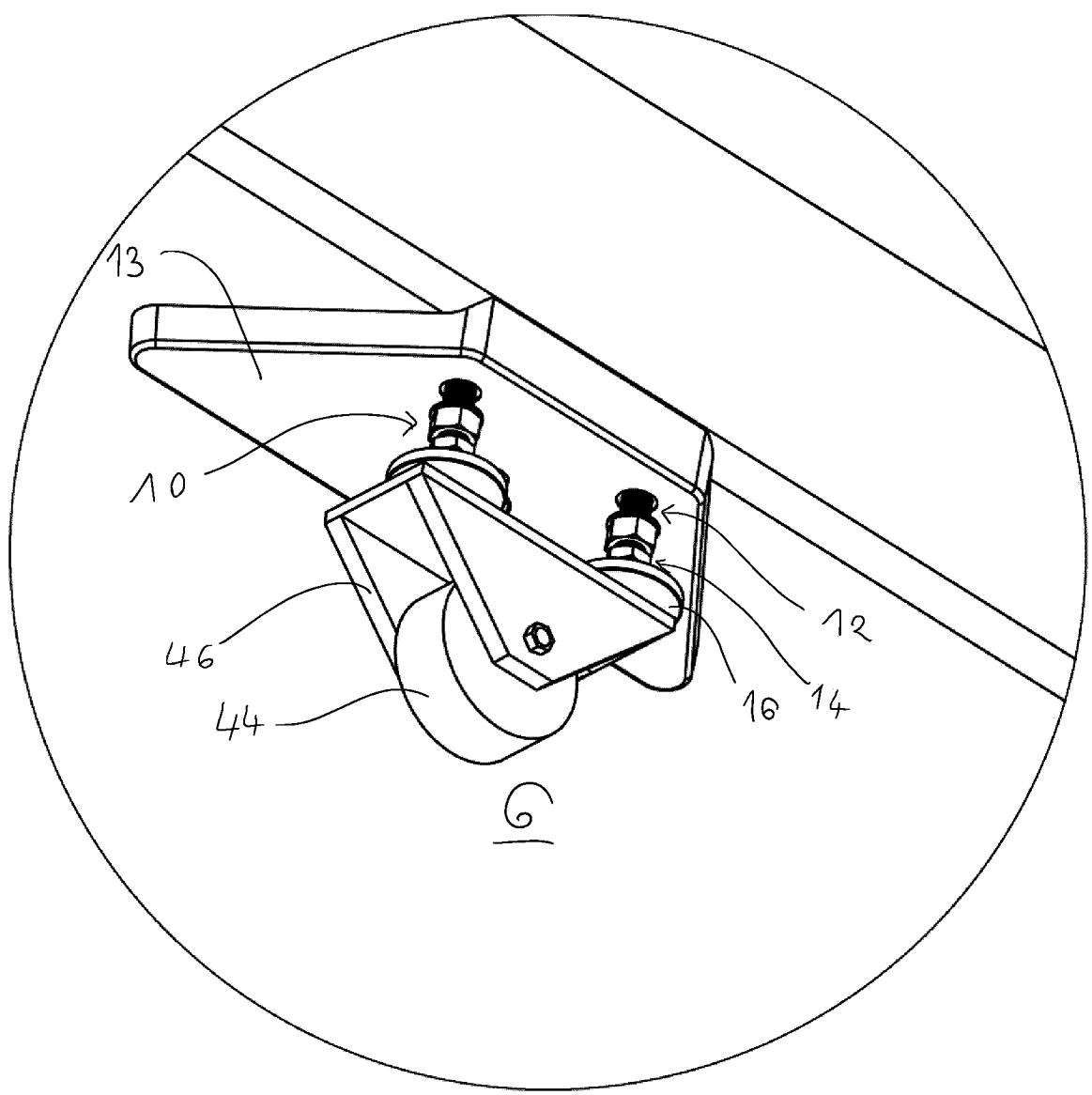
FIG. 30 is a zoomed view of a portion of FIG. 29 showing details of the sliding assembly including a roller.
Figure 31:
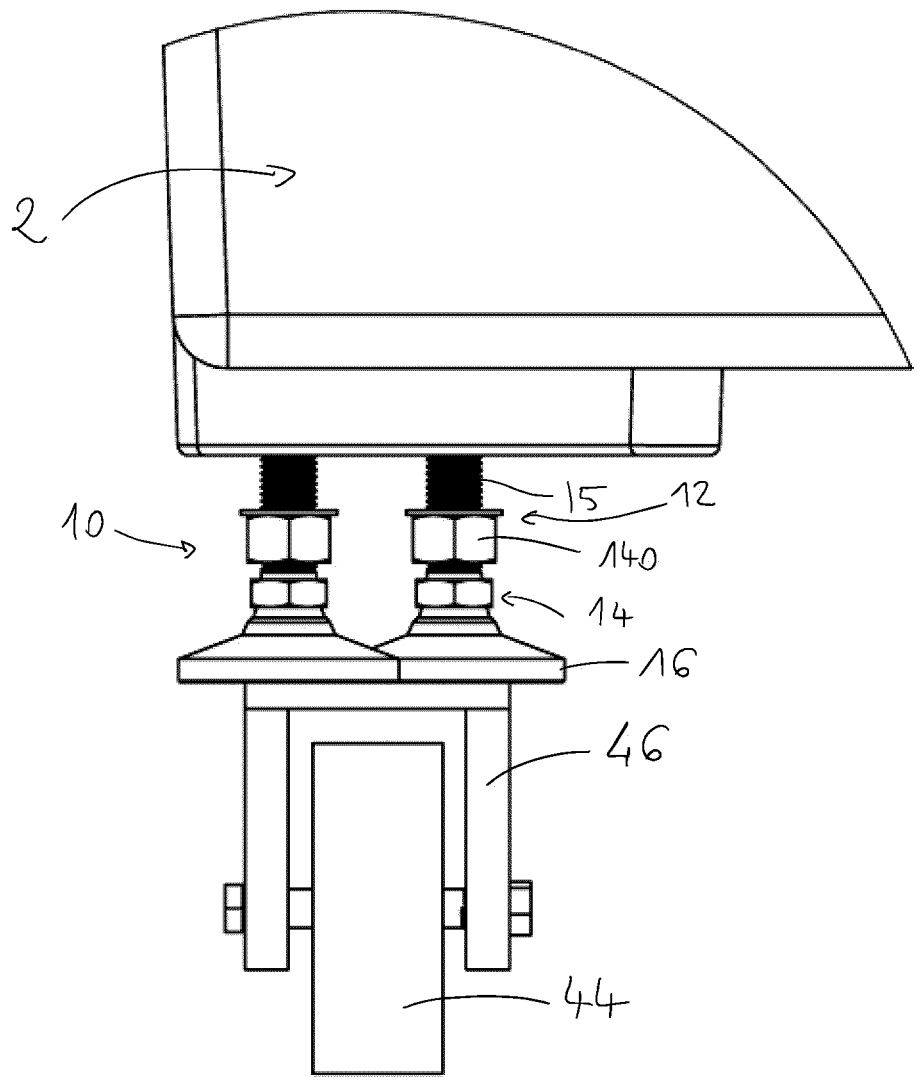
FIG. 31 is a front view of the portion of FIG. 30.
Figure 32:
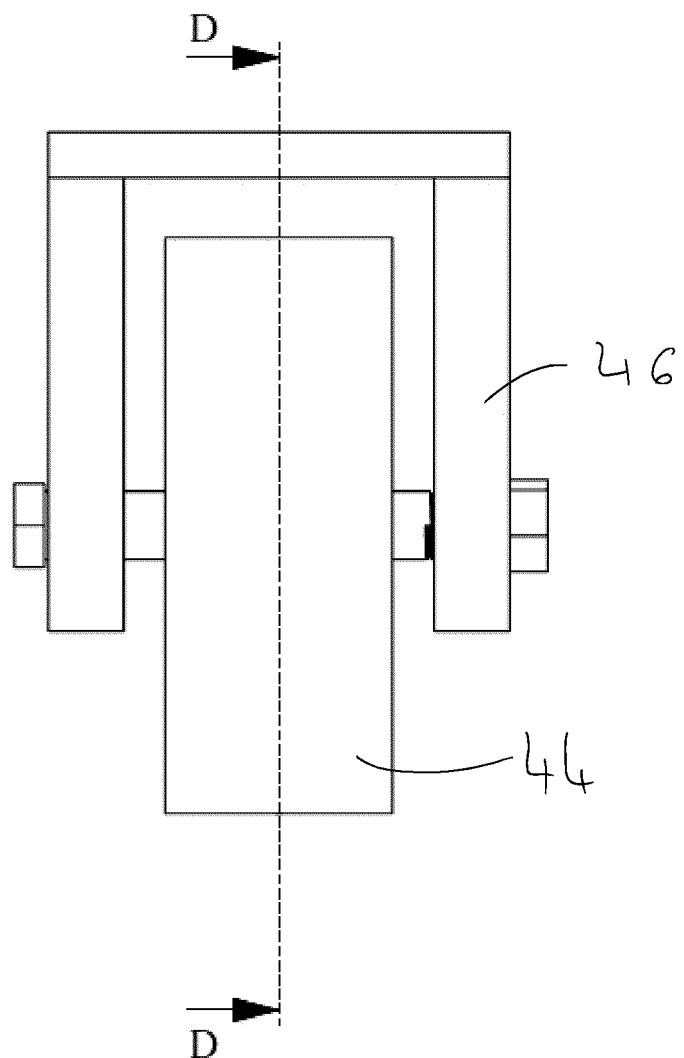
FIG. 32 is a front view of the sliding assembly showed in FIG. 31 including a roller and a connecting plate assembly.
Figure 33:
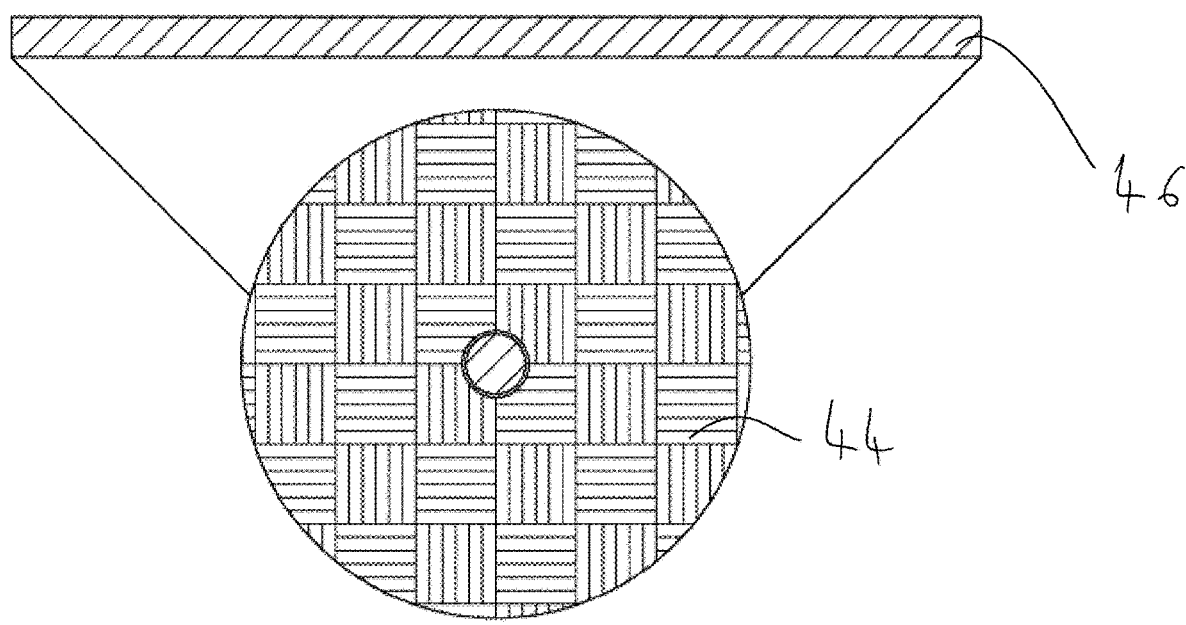
FIG. 33 is a cross-sectional view along line D-D of FIG. 32.

FIGS. 29 to 31 show an implementation wherein three adjustable levelling mechanisms (10) are connected to one roller (44) via a connecting plate assembly (46). The capping member (16) may be metallic and each capping member can be welded to a top surface of the connecting plate assembly (46). Other designs of roller and connecting plate assembly can be developed to be tailored to the levelling mechanism(s) which are directly mounted onto the base wall. For example, the connecting plate can be provided with a lip insertable within a corresponding recess of the roller, such that the roller enables transversal movements of the tank by pivoting about the lip of the connecting plate.

In some other implementations wherein the tank assembly includes levelling mechanisms, friction and/or sliding can alternatively be directly provided by selecting the appropriate material for the capping member of the levelling mechanism, and thereby without having to place a sole or another mechanism between the levelling mechanism and the support beam. For example, stainless steel capping members could be used without intermediate soles to enable sliding pursuant to expansion and contraction of the tank during refining operations.

In some other implementations, the tank assembly can include connectors, provided on the support beams, and offering anchorage to a portion of the tank. Referring to FIG. 23, support beams (36) offering support to the rear portion (62) of the base wall (6) can be provided at, at least one end thereof, with a connector (42) offering anchorage from an outer surface of the support beam (36). The connector (42) can be made of a metallic material such as stainless steel. The rear support beams (36) can be made of concrete polymer reinforced with embedded pultruded rebars (not shown in FIG. 23). Materials for front support beams can include Portland cement or polymer concrete. An upper surface of each support beam may also be covered with a corrosion-resistant fiberglass layer serving as a protective cap and avoiding corrosion of the concrete.

Additional Reinforcement Implementations

Strap or Rebar Assemblies

The electrolytic tank assembly can further include a variety of rebars and/or straps extending horizontally, vertically and in any directions within the x-y plane. Such rebars and/or straps can be provided within the base wall and/or side walls of the electrolytic tank for reinforcement thereof. For example, rebars can be provided as a reinforcement structure within the tank walls. Positioning of the rebars can be strategically chosen to enhance reinforcement of specific locations of the tank. In addition, referring to FIGS. 9 to 13, a plurality of horizontally and vertically extending straps (22) can be embedded within side walls of the electrolytic tank (not shown in FIGS. 9 to 13) so as to absorb and distribute dynamic loads applied to the tank during operation, lifting, transport, maintenance, reparation and placement, thereby avoiding cracking of the tank.

Figure 9:
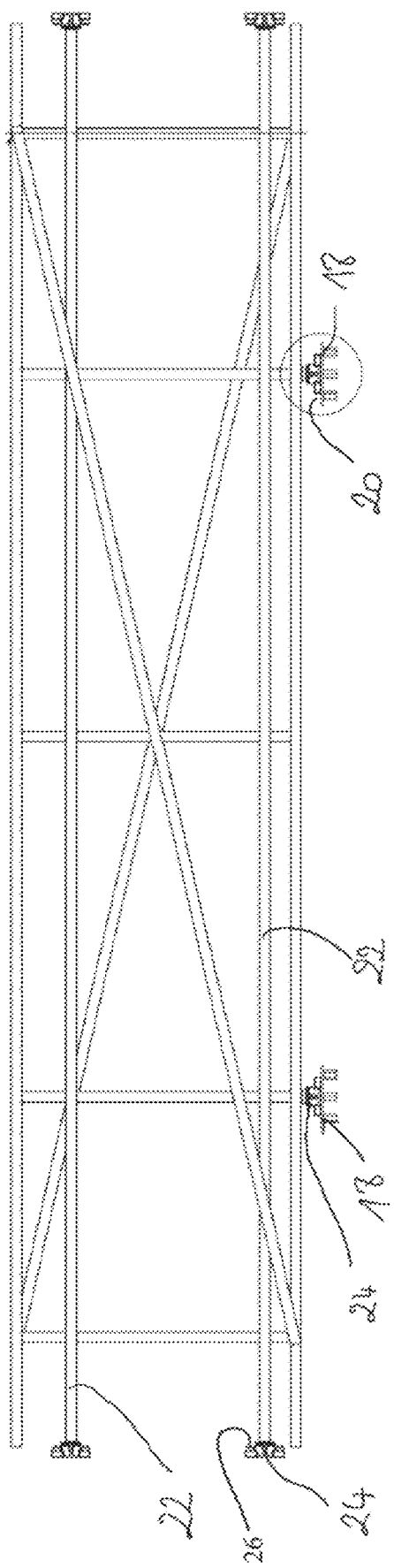
FIG. 9 is a side view of a reinforcement structure including anchoring members and elements which are embedded in side and base walls of the electrolytic tank.
Figure 13:
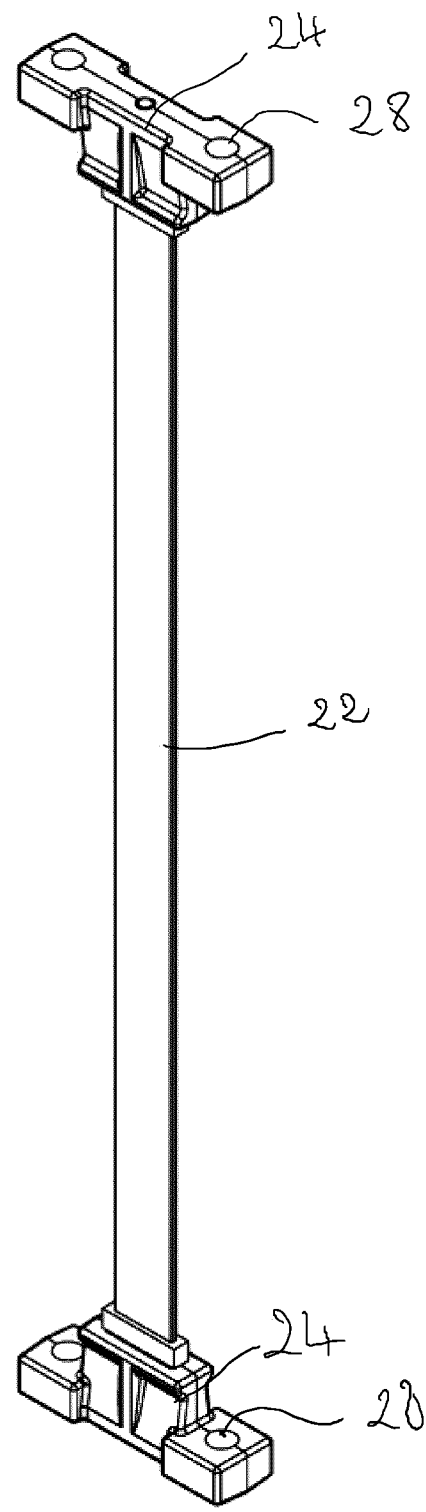
FIG. 13 is a top and front side elevational view of a vertically extending strap which can be embedded within a side wall of the electrolytic tank and provided at both ends thereof with a T-shaped main component than can receive connectors inserted therein.

In some implementations, the electrolytic tank assembly can further include connectors which are combined with the rebars and/or straps to cooperate with the anchor assemblies as described herein. Combination of the connector and the strap or rebar can be referred to as a strap assembly or rebar assembly. Different types of connectors can be provided at, at least one end of the straps or rebars. Referring to FIGS. 9 to 13, the connectors (24) can be shaped as a T, thereby including a main component (23) and two outwardly protruding branches (25). Referring to FIGS. 9 to 11, at least one barrel bolt, serving as anchor member (18) of an anchor assembly, can be connected to the connector (24) of a vertically extending strap (22) via the anchor plate (20). The strap (22) extends vertically within a side wall of the tank and unto the base wall such that a distal end of the barrel bolt (18) can be accessible from a lower surface of the base wall of the tank. The barrel bolt (18) can optionally be embedded within the base wall such that the distal end of the barrel bolt (18) is in alignment with the lower surface of the base wall. Referring to FIG. 13, a vertically extending strap (22) can be provided at both ends with the T-shaped connector (24) having a channel (28) defined within each of the two branches (25) thereof.

Connection between a strap assembly and an anchor assembly can distribute and reduce the mechanical constraints imposed to the anchor assembly. Other connection configurations are encompassed herein. For example, referring to FIG. 12, the connector (240) of the strap assembly can include a barrel bolt (26) provided at each outwardly protruding branch (25). Each of the channels (28) can cooperate at a distal end thereof with the barrel bolt (26), said barrel bolts (26) being in alignment with the distal end of each channel (28) of the connector (240). It should be noted that the illustrated connector (240) can be embedded within the base wall of the tank, and provided at a distal end of a vertically extending strap (22), such that the foot member of an adjustable levelling mechanism can be directly screwed within a respective barrel bolt (26), and without using the anchor plate (20) as seen in FIGS. 10 and 11. The barrel bolt (26) can thus offer abutment to the foot member of the adjustable levelling mechanism at a lower surface of the base wall (or to a lifting accessory at an upper surface of the corresponding side wall).

Figure 14:
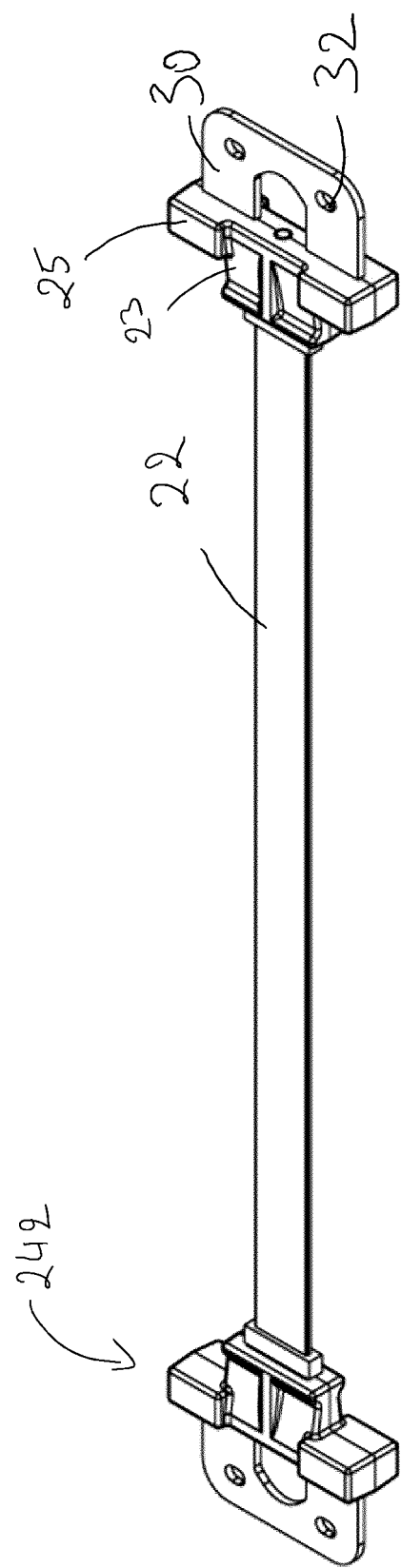
FIG. 14 is a top and front side elevational view of a horizontally extending strap which can be embedded within a base wall of the electrolytic tank and provided at both ends thereof with a T-shaped main component and a connecting plate extending outwardly therefrom.
Figure 15:
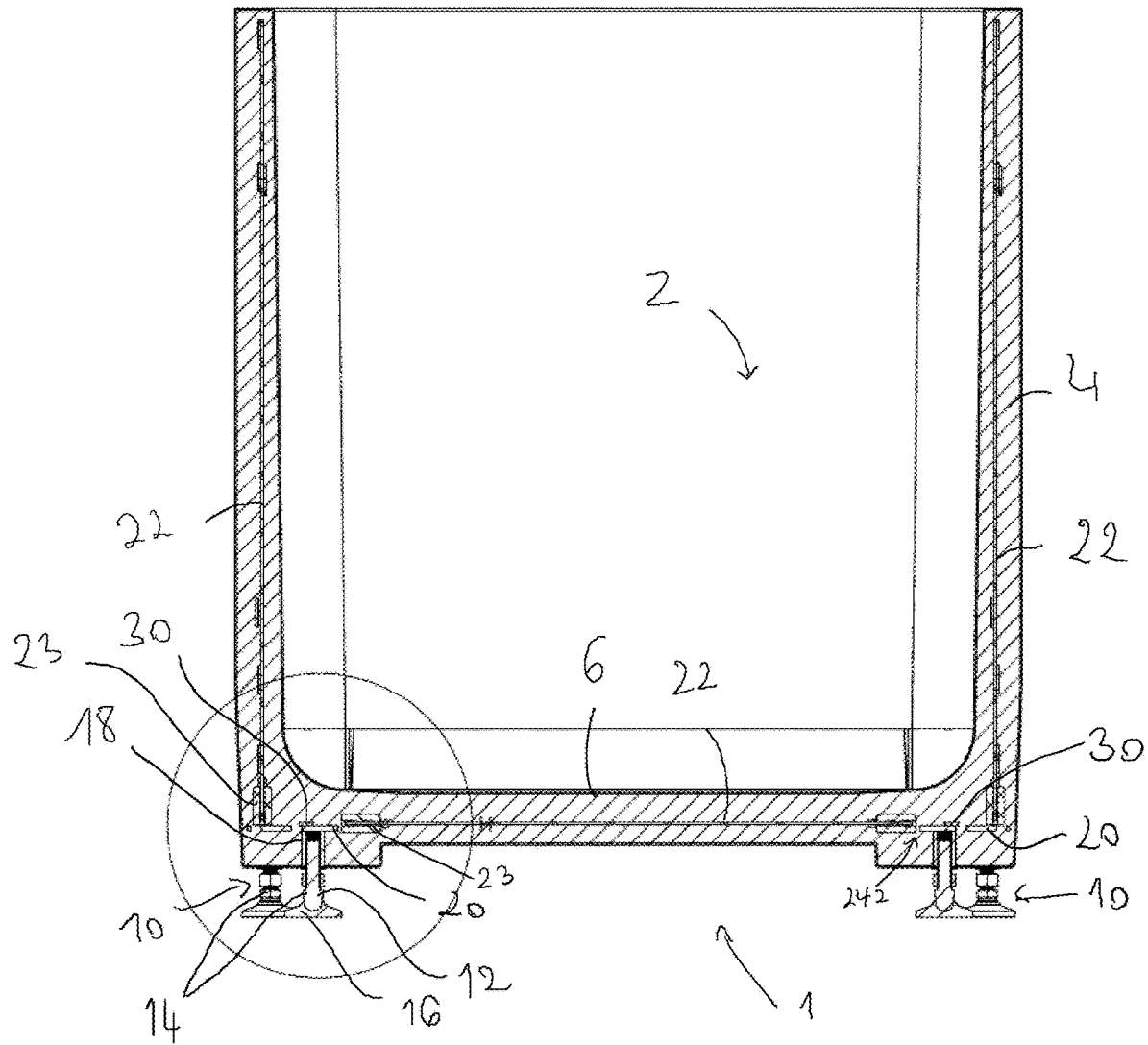
FIG. 15 is a cross-sectional view along a width of the electrolytic tank of FIG. 4 and showing the horizontally extending strap assembly of FIG. 14 embedded within the base wall of the electrolytic tank and joining two adjustable levelling mechanisms.
Figure 16:
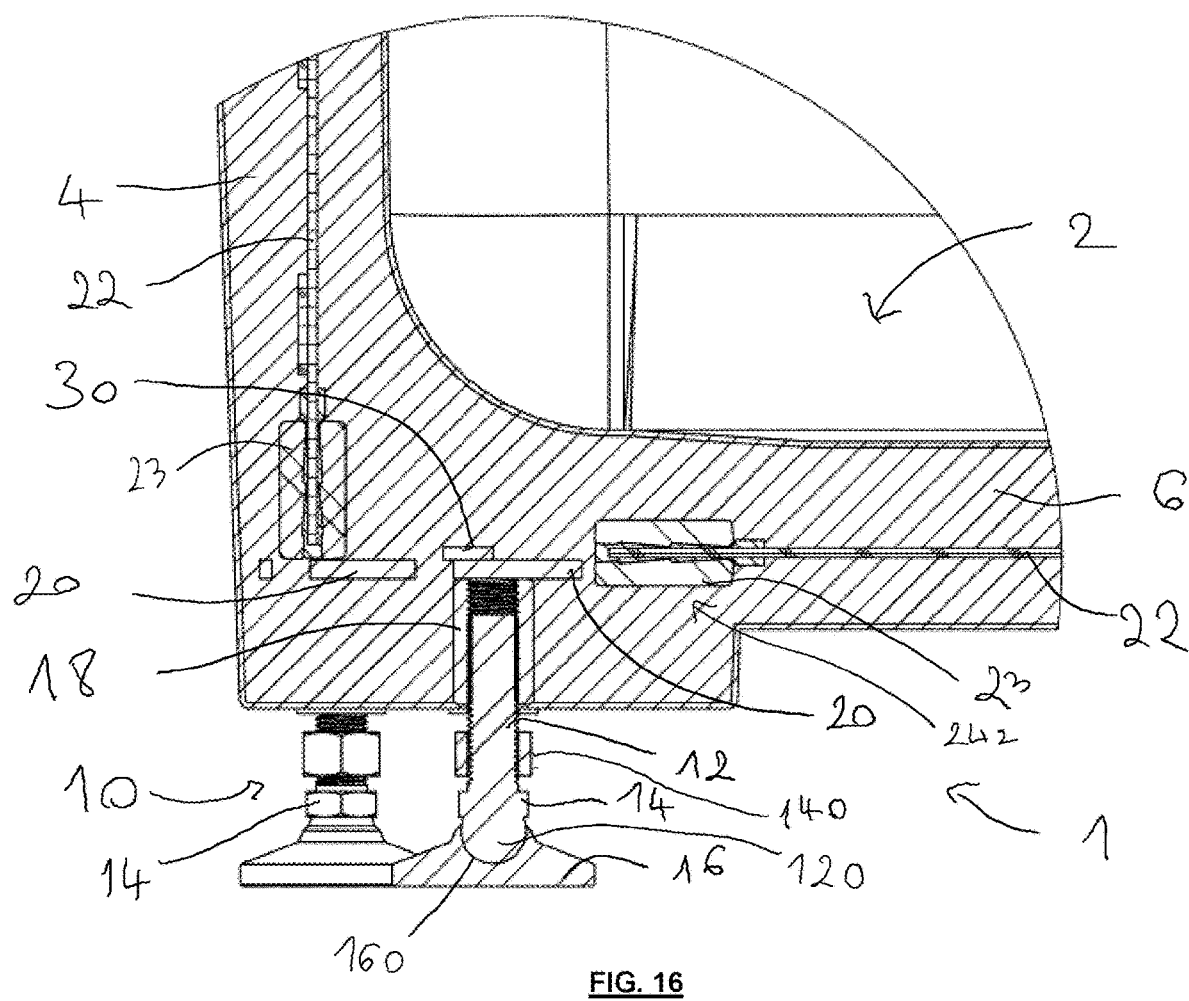
FIG. 16 is a zoomed view of a portion of FIG. 15 showing interconnection of the levelling mechanism with both vertically and horizontally extending strap assemblies.

In some other implementations, another type of strap assembly can be used to join two anchor assemblies provided at both ends of the front portion and/or the back portion of the tank, in order to strengthen the base wall and avoid rupture thereof upon divergent movements of the opposed foot members. Referring to FIG. 14, a horizontally extending strap (22) can be provided at a proximal end and a distal end thereof with a connector (242) including the main component (23), the two outwardly protruding branches (25) and an outwardly extending connecting plate (30). The connecting plate (30) can be provided with a pair of perforations (32). These perforations (32) can directly receive the threaded portion (15) of foot members (12) from levelling mechanisms, or can receive mating screws enabling fixation to the anchor plate (20) of anchor assemblies. Referring to FIGS. 15 and 16, the connecting plate (30) of the connector (242) can alternatively be welded or screwed to the anchoring plate (20) of the anchor assembly, the adjustable levelling mechanism (10) being thus connected to the strap assembly via the anchor assembly for enhanced load and constraints distribution. Such strap assembly can be provided to avoid overextension of the foot members.

Figure 34:
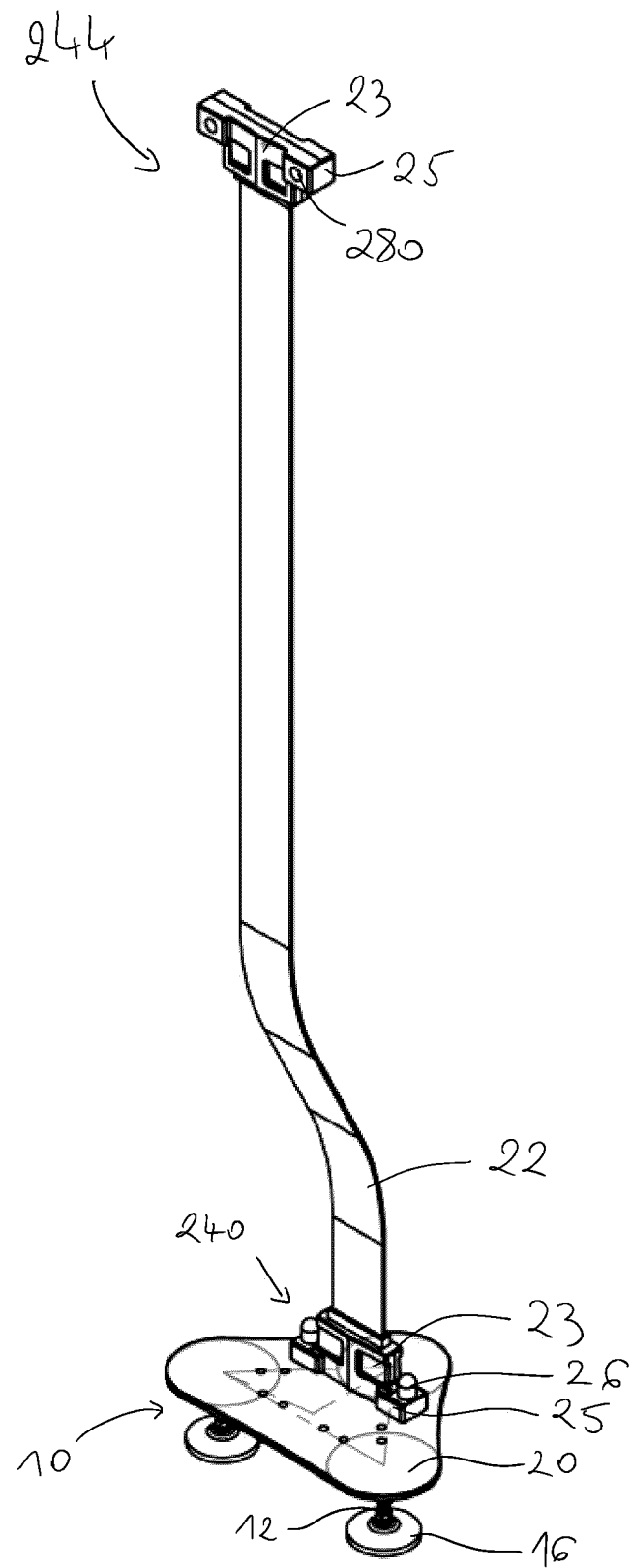
FIG. 34 is a top and left side elevational view of another strap assembly including a connector providing anchorage to an accessory at one end of the strap and another connector providing anchorage to a levelling mechanism as contemplated herein.

It should be further noted that the connector (24) illustrated in the Figures is shaped as a T, but various shapes could be used provided at, at least one end of the straps embedded in the electrolytic tank assembly, depending on the desired functionality and applied load distribution. For example, as seen in FIG. 34, a connector (244) can be provided with a horizontally extending channel (280) in each outwardly protruding branch (25) of the connector (244). Openings of each channel (280) can offer an anchor region to a lifting accessory (not illustrated), for example, from an exterior surface of a side wall of the tank.

In some other implementations, the electrolytic tank assembly can further include additional anchor assemblies, mounted to or embedded in walls of the tank, to provide anchorage to a lifting accessory for the lifting, transport and placement of the tank as described in PCT patent application No. PCT/CA2019/050106 incorporated herein by reference, or to any accessory related to operation, maintenance, tubing, etc.

Electrolytic Tank Construction

To further reinforce the structure of the electrolytic tank of the electrolytic tank assembly, walls of the electrolytic tank can be made of a material or a combination of materials selected to sustain mechanical stresses imposed to the tank and highly corrosive conditions.

In some implementations, the electrolytic tank includes a core that can be made of polymer concrete or prestressed polymer concrete. The electrolytic vessel can further optionally include a fiberglass-based envelope surrounding an inner surface (substantially corresponding to the cavity receiving the electrolytic bath) and an outer surface of the core, which can improve the chemical and mechanical resistance of the tank walls. The envelope may include at least one continuous fiberglass-based layer. Further optionally, the envelope may include multiple fiberglass-based layers. Further optionally, the fiberglass-based envelope includes multiple layers of at least one of fiberglass mat, knitted fiberglass, stitched, stitched-mat, knitted-mat and fiberglass woven roving. Optionally, the fiberglass-based envelope may include successive layers of fiberglass mat, knitted fiberglass, stitched, stitched-mat, knitted-mat and fiberglass woven roving. It should be understood that the choice of fiberglass-based material for the envelope may depend for example on the desired orientation of the fibers. Also, it should be understood that an outer envelope can be different in terms of composition and thickness than an inner envelope in contact with the electrolytic bath to ensure adequate chemical protection or structural protection to the tank.

Optionally, additional reinforcing or protective coatings including neat resin and/or synthetic fibers (e.g. fabric materials) can be applied onto an external surface (exposed surface) of the inner envelope and/or outer envelope. It should be noted that the at least one coating applied onto the inner envelope may differ from the coating applied onto the outer envelope, as the inner envelope may be exposed to the electrolytic bath contained in the cavity of the tank.

In other implementations, the surface of the elements embedded within the core of the tank (including barrel bolts (18 and 26), anchor plate (20), connecting plate (30), main component (24), straps (22) and rebars) can be ground and/or properly chemically treated to provide mechanical and covalent bonding with the material of the core. For example, the strap and/or rebar assemblies and the anchor assemblies can be chemically treated with silane or adhesives (e.g. Chemlock®), to provide covalent chemical adhesion with the polymer concrete of the core.

This application is a divisional of U.S. application Ser. No. 17/429,573, filed Aug. 9, 2021, titled "ASSEMBLIES FOR ALIGNMENT AND LEVELING OF AN ELECTROLYTIC TANK UPON EXPANSION OR RETRACTION THEREOF," which is a U.S. National Phase Under 35 U.S.C. § 371 of International Application No. PCT/CA2020/050178, titled "ASSEMBLIES FOR ALIGNMENT AND LEVELING OF AN ELECTROLYTIC TANK UPON EXPANSION OR RETRACTION THEREOF," filed Feb. 11, 2020, which is a PCT application claiming priority under applicable laws to U.S. provisional application No. 62/803,806 filed on Feb. 11, 2019, the contents of all of which are incorporated herein by reference in their entireties for all purposes.

Although embodiments of the electrolytic tank assembly and corresponding parts thereof consist of certain geometrical configurations as explained and illustrated herein, not all of these components and geometries are essential and thus should not be taken in their restrictive sense. It is to be understood, as also apparent to a person skilled in the art, that other suitable parts and cooperation therein between, as well as other suitable geometrical configurations, may be used for levelling and alignment of the electrolytic tank, as explained herein and as easily inferred herefrom by a person skilled in the art. Moreover, it should be appreciated that positional descriptions such as "above", "below", "horizontal", "vertical", "forward", "backward", "upward", "downward" and the like should, unless otherwise indicated, be taken in the context of the figures and should not be considered limiting.

The invention claimed is:

1. An assembly facilitating alignment and levelling of an electrolytic tank with respect to adjacent electrolytic tanks provided as a row, the assembly comprising:
   a sole assembly for controlling transversal movement of the electrolytic tank with respect to one or more support beams onto which the electrolytic tank is configured to be supported, wherein the sole assembly comprises:
   a first set of soles configured to provide friction and at least reduce transversal movement of a first portion of a base wall of the electrolytic tank when the electrolytic tank is supported by the one or more support beams, each sole of the first set of soles being provided between one support beam of the one or more support beams and the first portion of the base wall of the electrolytic tank, and
   a levelling assembly configured for levelling the electrolytic tank with respect to the one or more support beams, the levelling assembly comprising:
   at least four adjustable levelling mechanisms provided as two spaced-apart pairs respectively configured to connected to opposed edge portions of the base wall of the electrolytic tank when the electrolytic tank is supported by the one or more support beams, each adjustable levelling mechanism being independently actuable to cause upward or downward movement of the electrolytic tank, each adjustable levelling mechanisms comprising: (a) a foot member configured to operatively connect to a lower surface of the base wall of the electrolytic tank, the foot member having at least a portion extending downwardly from the base wall for supporting the electrolytic tank at a given height above one of the one or more support beams, and (b) a levelling member actuable to vary a position of the foot member with respect to the electrolytic tank, thereby changing the height at which the electrolytic tank is supported above the one or more support beams when actuated;
wherein each sole of the sole assembly is sandwiched between at least one of the adjustable levelling mechanisms and one of the one or mo oport beams to selectively allow or prevent transversal movements de electrolytic tank with respect to the one or more support beams.

2. The assembly of claim 1, wherein the sole assembly further comprises a second set of soles configured to provide sliding and enable transversal movement of a second portion of the base wall of the electrolytic tank with respect to the one corresponding support beams, each sole of the second set of soles being positionable provided between one support beam and the second portion of the base wall of the electrolytic tank.

3. The assembly of claim 2, wherein the soles of the second set of soles include a low kinetic friction coefficient material being Teflon®, Celcon®, Selkon®, HMWHDPE, HDPE, polyethylene, polypropylene, nylon, or any combinations thereof.

4. The assembly of claim 2, wherein each sole of the first and second sets of soles is sized and shaped such that a portion thereof contacts at least a portion of an upper surface of one support beam of the one or more support beams, and that another portion thereof extends away from the upper surface of said support beam.

5. The assembly of claim 2, wherein the size and shape of each sole from the first set of soles differs from the size and shape of each sole from the second set of soles.

6. The assembly of claim 2, wherein each of the first set and second set of soles includes pairs of a main sole and a secondary sole, each pair being provided between one support beam of the one or more support beams and respective first and second portions of the base wall of the electrolytic tank, thereby forming a double-layer sole.

7. The assembly of claim 6, wherein the main soles of the first set of soles offering enhanced friction, are made of a same material as the secondary soles of the first set of soles.

8. The assembly of claim 6, wherein the main soles of the second set of soles offering enhanced sliding, are made of a different material than the secondary soles of the second set of soles.

9. The assembly of claim 1, wherein the first portion is a front portion.

10. The assembly of claim 1, wherein the sole assembly further comprises a set of rollers configured to provide sliding and enable transversal movement of a second portion of the base wall when the electrolytic tank is supported by the one or more support beams, each roller of the second set of rollers being provided between one support beam of the one or more su port beams and the second portion of the base wall of the electrolytic tank.

11. The assembly of claim 10, wherein the second portion is a rear portion.

12. The assembly of claim 1, wherein the soles of the first set of soles include a high kinetic friction coefficient material being a rubber-based material.

13. The assembly of claim 1, wherein the levelling assembly further comprises:
at least four strap assemblies, each strap assembly comprising a vertically extending strap and a connector provided at an end of the vertically extending strap, wherein the connector of each strap assembly is connected to one adjustable levelling mechanism of the levelling assembly.

14. The assembly of claim 13, wherein each connector comprises at least one barrel bolt defining a threaded channel, and each foot member of the levelling assembly has a mating threaded portion insertable within one barrel bolt.

15. The assembly of claim 13, further comprising an anchor assembly being configured to be at least partially embedded within a base wall of the electrolytic tank, and the anchor assembly including at least four anchor members defining an anchoring surface being accessible from a lower surface of the base wall of the electrolytic tank, the anchoring surface providing anchorage to the levelling assembly.

16. The assembly of claim 15, wherein the anchor assembly further comprises at least four anchor plates, each anchor plate having an upper surface and a lower surface, the lower surface being connected to one anchor member to distribute a constraint pressure applied to the anchor member within the base wall of the electrolytic tank.

17. The assembly of claim 16, wherein the anchor member is welded or chemically fixed onto the anchor plate.

18. The assembly of claim 15, further comprising at least four strap assemblies, each strap assembly comprising a vertically extending strap and a connector provided at an end of the vertically extending strap, wherein the connector of each strap assembly is connected to one anchor plate of the anchor assembly.

19. The assembly of claim 15, wherein each anchor member defines a channel providing the anchoring surface for receiving at least a portion of the foot member of one adjustable levelling mechanism.

* * * * *